US010173315B2

(12) United States Patent
Giamanco et al.

(10) Patent No.: US 10,173,315 B2
(45) **Date of Patent: *Jan. 8, 2019**

(54) PORTABLE WORK STATION

(71) Applicants: Jerry R. Giamanco, Bayside, NY (US); Kenneth Campanelli, Huntington, NY (US)

(72) Inventors: Jerry R. Giamanco, Bayside, NY (US); Kenneth Campanelli, Huntington, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/935,770

(22) Filed: Mar. 26, 2018

(65) Prior Publication Data

US 2018/0222035 A1 Aug. 9, 2018

Related U.S. Application Data

(60) Division of application No. 14/950,607, filed on Nov. 24, 2015, now Pat. No. 9,943,956, which is a continuation-in-part of application No. 14/544,106, filed on Nov. 25, 2014, now Pat. No. 9,381,932.

(60) Provisional application No. 61/963,250, filed on Nov. 27, 2013.

(51) Int. Cl.

| | |
|---|---|
| ***A45C 13/00*** | (2006.01) |
| ***B23P 19/00*** | (2006.01) |
| ***B25H 3/04*** | (2006.01) |
| ***B25H 5/00*** | (2006.01) |
| ***B25H 3/02*** | (2006.01) |
| ***B25H 3/06*** | (2006.01) |

(52) U.S. Cl.

CPC ............... *B25H 3/04* (2013.01); *B25H 3/022* (2013.01); *B25H 3/06* (2013.01); *B25H 5/00* (2013.01)

(58) Field of Classification Search

CPC ......... A47B 23/042; B62B 5/00; B62B 1/002; A45C 13/00; A45C 5/14; B23P 19/00

USPC .......................................................... 224/401

See application file for complete search history.

(56) References Cited

U.S. PATENT DOCUMENTS

| | | | | | |
|---|---|---|---|---|---|
| 3,436,093 | A | * | 4/1969 | Ruffley, Jr. | B62B 1/264 280/47.27 |
| 3,936,026 | A | * | 2/1976 | Hampel | F16M 11/08 248/349.1 |
| 4,356,854 | A | * | 11/1982 | McGee | B25H 3/00 182/129 |
| 4,488,497 | A | * | 12/1984 | Bevans | B25H 3/06 108/134 |
| 5,437,367 | A | * | 8/1995 | Martin | A45C 5/14 190/107 |

(Continued)

*Primary Examiner* — Brian D Nash
(74) *Attorney, Agent, or Firm* — Alfred M. Walker

(57) ABSTRACT

A canvas tool caddy designed to removably fit over the handle of a rolling tool chest with telescopic handle. The canvas tool caddy is meant to supplement the tool storage of the rolling tool chest. The canvas caddy is removable from the rolling tool chest telescopic handle. The tool caddy optionally has one or more flexible, bendable spines, to bend the flat tool supporting base wall surface substrate into an open planar flat display configuration which retains its shape while supported on the handle of the rolling tool chest. The rolling tool chest's telescopic handles provide upward load forces counteracting downward load forces of the handle, and the equilibrium is spread equally along an internal horizontal spine, to keep the tool caddy open when opened from a close transport state to an open viewable, tool accessible state.

12 Claims, 20 Drawing Sheets

(56) References Cited

U.S. PATENT DOCUMENTS

| | | | | | |
|---|---|---|---|---|---|
| 5,529,322 | A * | 6/1996 | Barton | A45C 5/14 | 108/147.11 |
| 5,893,572 | A * | 4/1999 | Parks | B25H 1/04 | 280/47.18 |
| 5,961,134 | A * | 10/1999 | Congleton | G06F 1/1628 | 280/37 |
| 6,105,508 | A * | 8/2000 | Ryburg | A45C 7/00 | 108/42 |
| 6,113,050 | A * | 9/2000 | Rush | A47B 23/042 | 248/346.01 |
| 6,398,235 | B1 * | 6/2002 | Cary | B25H 3/00 | 280/47.18 |
| 6,439,134 | B1 * | 8/2002 | Ryburg | A45C 7/00 | 108/42 |
| 6,736,073 | B2 * | 5/2004 | Ryburg | A45C 7/00 | 108/42 |
| 7,946,609 | B2 * | 5/2011 | Johnson | A45C 5/14 | 280/47.19 |
| 7,987,955 | B2 * | 8/2011 | Puchalski | A45C 5/14 | 190/10 |
| 8,146,722 | B1 * | 4/2012 | Moreno | A45C 5/14 | 190/115 |
| 9,277,796 | B1 * | 3/2016 | Elam | A45C 9/00 | |

* cited by examiner

PORTABLE WORK STATION

RELATED APPLICATIONS

This application is a divisional of application Ser. No. 14/950,607 filed Nov. 24, 2015 (the '607 application), which '607 application is a continuation-in-part of application Ser. No. 14/544,106, (the '106 application) filed Nov. 25, 2014, now U.S. Pat. No. 9,381,932 dated Jul. 5, 2016, and claims priority under 35 USC § 120, which '106 application claims benefit and priority of provisional application Ser. No. 61/963,250 (the '250 application) filed on Nov. 27, 2013 under 35 U.S.C. § 119(e), which '106, '250 and '607 applications are incorporated by reference herein.

FIELD OF THE INVENTION

The present invention pertains to an apparatus that provides a portable tool caddy that mounts on top of a wheeled or rolling tool bags, hand trucks and any similar equipment, or even a luggage bag used to transport tools. The universal insertable design allows the apparatus to be secured atop most extensible rolling tool bag handles attached to the vertical extensible or non-extensible support members. The telescopic, extensible feature of the vertical support members can be adjusted to provide a convenient working height. The canvas tool caddy preferably is also portable and retains a mostly planar slat open display configuration when opened and supported upon the handle of a wheeled or rolling tool bag.

BACKGROUND OF THE INVENTION

There are existing luggage or rolling tool bag work surfaces that mount to the extensible telescopic luggage or tool rolling bag luggage handle with a variety of designs.

U.S. Pat. No. 6,267,277 of Taylor discloses a portable, flexible tool holder having a generally rectangular flexible body, with the outer surface having a plurality of magnets connected thereto, the inner surface having a plurality of pockets and loops thereon for holding tools and equipment, having side edges which may be rolled together to tightly enclose tools. However, Taylor '277 does not disclose a flexible tool caddy.

U.S. Pat. No. 6,152,300 of Perkins discloses a tool storage device with a plurality of tool and equipment storage compartments, which are disposed on the front surface of a canvas material, and having a generally rectangular configuration that is draped and secured over a telegraph pole, that in addition can be rolled for portability. Perkins' 300 does not disclose a flexible,—canvas tool caddy.

U.S. Pat. No. 4,765,472 of Dent discloses a tool holder which includes an elongate base strip of flexible material, such as canvas, leather, nylon, etc., as to form a plurality of various size pockets of various sizes which could be provided to accommodate tools or implements of different size. The free ends of the tool holder are joined together by fasteners. However, the tool holder of Dent, '472 requires a bucket to support it.

U.S. Pat. No. 4,773,535 of Cook discloses canvas sheets with a plurality of pockets that can be draped over, or supported by, a supporting work horse device, that can be folded over thereon. U.S. Pat. No. 5,639,003 of Utzinger discloses a portable tool carrying apparatus, made of some type of heavy fabric, such as canvas, but may also be made of plastic sheet material, leather or any other suitable material, where at least the front panel has a plurality of tool receiving pockets, that can be secured to the top of a ladder in a number of ways and is foldable to allow the apparatus is used as a tool belt.

U.S. Pat. No. 6,305,498 of Itzkovitch discloses a tool carrier assembly comprising a flexible carrier sheet and a plurality of tool holding elements mounted on a saw horse.

Shipman (Patent Application Publication No.: US 2003/0227148 A1) provides two different means of support for their tool holder. The handle (Item 82) is separate from their two vertical means of support. Shipman's hanging straps (Item 70 and 72) provide a vector force support configuration supported by two vertical upward vector forces transmitting the load substantially to two point loads on a sample horizontal support (Item 80). Shipman's alternate tool holder support (Support Plate 44 and extensions 56, 58) utilizes a rigid support plate fastened to the full width of the tool bag that provides a continuous distributed load to the support plate from continuous distributed load of the tool holder. In both cases, the structural load of the tool holder is transmitted to the support plate (Support Plate 44 and extensions 56, 58) with even load distribution.

Other inventions include mounting devices that attach to the vertical extensible telescopic support members. For example, see Work Surface for Luggage and Luggage Carrier: U.S. Pat. No. 6,105,508 issued Aug. 22, 2000, of Inventor Ryburg, U.S. Pat. No. 6,439,134B1 issued Aug. 27, 2002, of Inventor Ryburg. Work Surface for Luggage and Luggage Carrier and U.S. Pat. No. 6,736,073B2 issued May 18, 2004, also of Inventor Ryburg. The embodiments of these patents rely on a cantilevered support attached to the vertical extensible telescopic luggage handle support members with an integral support leg. The present invention differs in that it is mounted on top of the vertical extensible support member luggage handle, which extends into a closed end cavity extending upward from the bottom of the luggage handle of the portable tool caddy.

U.S. Pat. No. 3,301,619, for a Utility Box, issued Jan. 14, 1965, of Inventor: Sterling G. Mead, shows a utility box mounted atop the rail of a boat. The utility box of Mead '619 is suspended from an external support member. The tendency of the utility box of Mead '619 to rotate is counterbalanced by the lower extremity of the utility box against the lower portion of the utility box. The present invention differs from Mead '619, in that it is vertically supported atop the luggage handle.

U.S. Pat. No. 5,961,134, issued Oct. 5, 1999, of Inventor Congleton, et al., discloses a pivotable flat shelf having pivot arms pivoting up to move the vertically oriented flat shelf to a horizontal position atop the telescopic luggage handle. However, the flat shelf of Congleton does not have an upwardly extending closed cavity into which a telescopic luggage handle extends, as in the container case of the present invention.

U.S. Pat. No. 4,356,854 issued Nov. 2, 2012, of inventor McGee, discloses a tool carrying pouch, which has a downwardly extending flexible skirt descending from the peripheral edge of the tool carrying pouch. However, McGee's pouch does not have a closed ended recess cavity extending upward in a container, into which closed ended recess cavity a telescopic luggage handle extends as in the present invention.

OBJECTS OF THE INVENTION

An object of the present invention is to provide a portable tool caddy that mounts on top of, and, in combination with, a luggage or rolling tool bag handle of vertical, extensible, telescopic members of wheeled luggage, rolling tool bags, hand trucks and similar. This apparatus provides a removable, portable tool caddy which can also be separately carried. The tool caddy contains a carry handle with a bottom recessed cavity that optionally contains a frictional or compressive fit which mounts on top of the luggage or rolling tool bag handle. The optional frictional or compressive fitting forces are distributed throughout the tool caddy handle recessed cavity and transmitted onto the rolling tool bag handle. Instead of a compressive fit, the bottom recessed cavity can be a lower open but closed sided recess cavity of a rigid plastic or metal box with friction or no friction fit features. In its preferred embodiment, the weight load of the tool caddy and its contents is substantially vertical on the extensible telescopic and non-telescopic support members with minimal cantilever effect.

Other objects will become apparent from the description of the present invention. Additional objects, advantages and novel features will become apparent upon examination of the following and will be learned throughout usage of the invention.

SUMMARY OF THE INVENTION

As the mobility of travelers and professionals increases, the demand for additional mobile storage and portable work surfaces is increasing. The present invention provides a portable, tool caddy for mobile tradesworkers and travelers using tools with the work surface of the prior application described herein.

This canvas tool caddy of the present invention is a continuation-in-part of Applicants' prior application Ser. No. 14/544,106, (the '106 application) filed Nov. 25, 2014, which claims priority under 35 USC § 120, which '106 from Applicants' provisional application Ser. No. 61/963,250 (the '250 application) filed on Nov. 27, 2013 which '106 and '250 applications are incorporated by reference herein.

In our related aforementioned applications, Applicants disclosed an apparatus that provides a portable work station that mounts on top of the handle of wheeled luggage, rolling tool bags, hand trucks and any similar equipment. The universal clamp design allows the apparatus to be secured atop most handles attached to the vertical extensible or non-extensible support members. The telescopic, extensible feature of the vertical support members can be adjusted to provide a convenient working height.

The portable work station of our aforementioned application includes a case with a cover, which also serves as an external work surface. A removable, internal work surface can also be included inside the case to cover personal items, tools, parts and other stored items. The work station is mounted on top of the telescopic handle and secured to the handle with a clamping mechanism that is recessed into the bottom of the case. The top surface of the case is a hinged cover that can be used as work surface. There is an additional, removable work surface inside the case to provide a flat working surface inside the case. This removable work surface also serves to contain any items stored underneath in the case. An obvious, alternate embodiment of the portable work station can provide a fixed, unhinged, top work surface without interior storage that can use, in combination with, the tool caddy for storage capacity.

In a preferred embodiment, the portable work station of our aforementioned applications includes a housing with an interior formed by a substantially flat bottom, side walls and a cover adapted to be opened, wherein the cover, when closed, forms an outer work surface. A cavity receptacle is provided within the interior of the work station. The flat bottom of the housing has an opening in communication with the cavity receptacle and is adapted to receive the handle member of the upwardly extensible member, when the work station is deployed on the handle of the extensible member, the work station is removable from the handle member and the extensible member for storage or transport. A clamping apparatus clamps the handle member within the preferably closed ended cavity receptacle for allowing the work station to be employed while mounted on the extensible member.

Similarly to the aforementioned work station mounted on an extensible handle of a rolling luggage or rolling tool bag, the portable tool caddy of the present invention can contain tools, supplies, devices, documents and instruments. This work tool caddy, while mounted atop a luggage or rolling tool bag handle, can also be used by traveling working tradespeople. Preferably made of canvas or other fabric or plastic material, the tool caddy can also be made of rigid segments bendable along vertical lines. The canvas tool caddy has one or more flexible, bendable spines that can remain in a bent shape within the horizontal plane, such as arcuate or angular, including optionally one intermediary or bottom spine. The horizontal spines can be any material that will retain their shape when bent or substantially remain linear except when restrained to bend the tool caddy spines in its rolled up configuration. In its preferred embodiment, at least one of the spines located at the bottom edge of the canvas tool caddy provides a sturdy, arcuate base edge which helps keep the open canvas tool caddy in an arcuate or unfolded configuration for viewing of the tools carried in the canvas tool caddy. At least one spine is horizontally aligned within a top region of tool caddy 10 to keep it open. The spines can have rigidity and flexibility, so that they are bendable, but they retain their open state, or they can be temporarily bendable, but flexible enough to retain an open, tool accessible state of the tool caddy. Alternately, the caddy can also be made of a rigid, preferably single, unbendable sheet such that it cannot be rolled up. Spines can be made of cable, wire, flat stock, hollow tubes, solid rods of metal, plastic, fiberglass or any combination thereof that can perform the functions described herein.

Therefore, when the canvas tool caddy is removed from the top of the luggage or rolling tool bag handle, it can be rolled up, or folded, and carried. It can also be attached to the vertical extensible telescopic members and placed atop the bag in its travel position. This is accomplished by sliding the handle fastened to the top of the tool caddy over the handle and slid down the vertical extensible members until the tool caddy rests on top of the luggage bag, or rolling tool bag. When folded and closed by fastener clips, the tool caddy can also be removed and carried as a separate brief tool caddy with its carrying rolling tool caddy handle. Alternate embodiments of the horizontal spines can vary a full range from substantially unbendable/rigid to fully flexible in the horizontal plane. In the vertical plane, the horizontal spine(s) remains substantially rigid to support the tool caddy vertical load, in particular the top horizontal spine. Additional embodiments include a tool caddy constructed of a permanently rigid sheet that remains flat and unfoldable that can be fabricated from sheet metal, rigid plastic or similar materials.

The present invention provides a removable, portable tool caddy for any mobile service providers and mobile professionals such as technicians, mechanics, automotive technicians and mechanics, students, photographers, carpenters, electricians, plumbers, artists, health care providers, facility and power plant workers, hair stylists, animal care providers, land surveyors, locksmiths, field engineers, business travelers, family travelers, facility workers, maintenance workers and anyone who requires a mobile, portable tool caddy that attaches to wheeled luggage, rolling tool bags and hand trucks. The present invention provides a convenient tool caddy for these individuals who wheel their bags to a job location and desire additional storage on their rolling tool bag or luggage with a convenient display of their tools, instruments, supplies, documents and similar. The vertical, telescopic extensible members provide a flexible working height for the work surface, standing or sitting.

This invention also provides a portable work surface in the field, as well as a tool caddy that can be used to store supplies, tools and instruments. The work surface and tool caddy can be used in combination with each other or separately. Users of the present invention can use the tool caddy to visually display and conveniently hold tools and parts in the respective pockets of the canvas tool caddy, instead of laying them down on surrounding areas where they have a tendency to be misplaced. Parts and tools are less likely to be lost because the parts and tools that are placed on the tool caddy while performing their work remain stored in the portable tool caddy for departure from the worksite.

Location of the work surface on top of the telescopic luggage or rolling tool bag luggage handle provides the user with a convenient working height to avoid bending down. The working height is adjustable by extending or retracting the vertical extensible telescopic members.

The present invention provides a portable tool caddy that mounts on top of a luggage or rolling tool bag luggage handle that is supported by vertical, extensible telescopic members of wheeled luggage, rolling tool bags, hand trucks and similar. This apparatus provides a removable, portable tool caddy, which preferably has one or more internal spines enabling the canvas tool caddy to be bent to open and to close and assume an upright position.

The apparatus attaches to the luggage or rolling tool bag luggage handle of wheeled equipment such as wheeled luggage, rolling tool bags and hand trucks but is not limited to wheeled equipment. It can also be used on wheeled cooler handles to store utensils, cups and food service instruments for picnics and similar. Since the present invention includes a tool caddy, it provides additional storage capacity for selected, frequently used tools from an overall collection of tools, stored in existing wheeled and non-wheeled tool box and tool bag equipment.

The tool caddy includes a foldable base wall with a pockets and slots for holding tools and also serves as a folded carry case, closable with belt fasteners.

The tool caddy is mounted on top of the telescopic luggage or rolling tool bag luggage handle and is preferably secured to the luggage or rolling tool bag handle with a hollow receptacle fitting mechanism that is recessed into the bottom of the tool caddy's carry handle.

The portable tool caddy material can be manufactured from, but not limited to, canvas, metal, fabric, fiberglass, flexible plastic, or a rigid sheet material or combinations thereof.

According to the present invention, the foregoing and other objects are attained by providing a removable, portable tool caddy. This tool caddy is solely supported by the telescopic support members without any external supports, when it is mounted on top of the extensible handles of the rolling tool bag in one mode.

In summary, the portable tool caddy is used in combination with a mobile tool bag or luggage device having an upwardly extensible member(s) with a horizontally extending luggage handle member at a top end thereof for directing and controlling movement of the mobile device. In a preferred embodiment, the portable tool caddy includes a bendable, flexible spine-reinforced base support wall with flat bottom, side and top edges. The canvas tool caddy is adapted to be opened as a flat display surface when suspended from its top carry handle located on top of the extensible supports of a rolling tool bag, wherein the portable work surface, forms an outer work surface when resting on top of the luggage handle. A bottom recessed cavity receptacle is provided within the interior of the top carry handle of the tool caddy.

The handle of the tool caddy's opening is in communication with the extensible tool box or luggage handle. The aforementioned bottom recessed cavity receptacle of the tool caddy handle is adapted to receive the upper handle member of the upwardly extensible member of the rolling tool bag, when the tool caddy is deployed on the luggage handle of the extensible member of the rolling tool bag. The tool caddy is removable from the luggage handle member and the extensible member for storage or transport. An insertable or compressive fit preferably fits the telescopic tool bag handle member within the preferably closed-ended tool caddy top handle with the bottom recessed cavity receptacle, for allowing the canvas tool caddy to be employed while mounted on the extensible member of the rolling tool bag.

Preferably, the aforementioned one or more flexible, bendable spines of the tool caddy can be bent and left in the bent shape, to allow the canvas tool caddy, when opened and bent into an arcuate or angular shape, to form an open display when held on the top of the telescopic handle, holding tools thereon. In a preferred embodiment, the spines stay open, substantially linear, until closed. In use of its angular or arcuate shape or when substantially open, the method of forming and using a portable tool caddy includes the steps of a) using a horizontally extending handle member located at a top end of an extensible member extending from a mobile wheeled rolling, tool bag device for directing and controlling movement of the mobile device;

b) mounting a tool caddy on the wheeled rolling tool bag extensible handle member when the extensible member is extended, wherein the tool caddy includes a top carry handle with an interior formed by a hollow bottom, side walls and a manually graspable top, so that the carry handle's bottom recess receives the extensible rolling tool bag handle member, when the tool caddy is deployed on the extensible member;

c) inserting the extensible rolling tool bag handle member within the receptacle of the carry handle of the tool caddy, for allowing the tool caddy to be employed while mounted on the rolling tool bag extensible handle member; and d) removing the tool caddy from the extensible rolling tool bag handle member and retracting the extensible member for storage or transport of the tool caddy and/or the mobile device.

The method also optionally includes providing the tool caddy with one or more interior and preferably linearly extending, bendable, flexible spines, so that, when bent into a non-flat angular or arcuate shape closes the caddy for storage or transport, or in its substantially flat position to form an open display tool holder, with easy access to the tools displayed substantially vertically oriented wall surface substrate of the tool caddy.

The objects and features of the present invention are set forth within. The mounting of the present invention set forth within is similar for all applications on wheeled luggage, rolling tool bags and hand trucks. Throughout the following discussion reference numerals have the meaning in the following list. This list is provided to facilitate understanding of the drawings.

BRIEF DESCRIPTION OF THE DRAWINGS

The present invention can best be understood in connection with the accompanying drawings. It is noted that the invention is not limited to the precise embodiments shown in drawings, in which.

LIST OF REFERENCE NUMERALS

Figure 1:
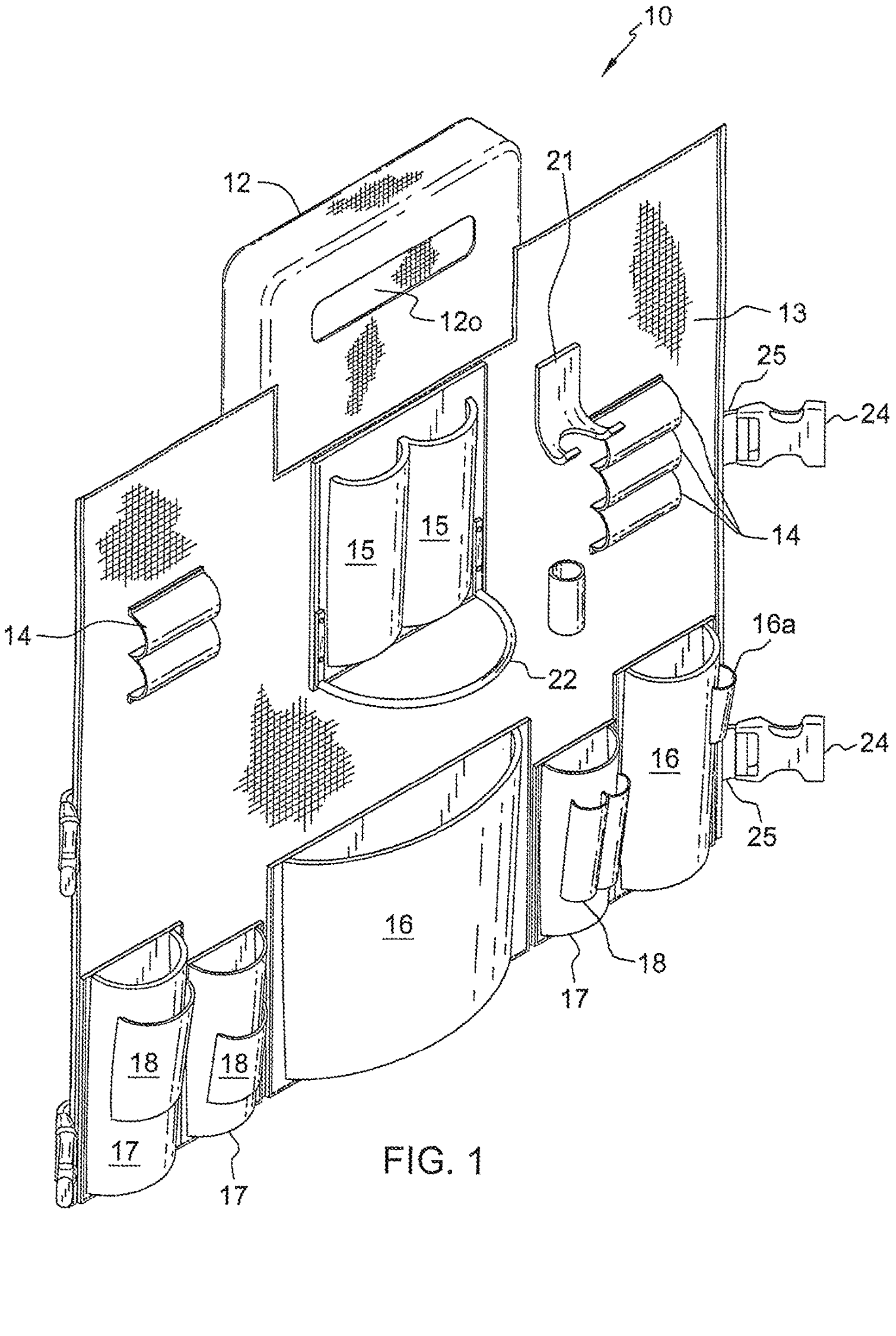
FIG. 1 is a perspective view of an embodiment for a portable tool caddy of the present invention, showing a tool caddy having a flat base vertically extending wall surface substrate, with a carry handle having a recess for mounting atop a typical wheeled luggage or rolling tool bag, and showing a plurality of pockets for tools.

10 tool caddy
12 tool caddy handle
12*a* closed ended hollow receptacle recess cavity of handle 12
12*b* flexible flap of handle 12
12*bb* flexible fastener VELCRO® pad
12*bbb* reciprocal fastener VELCRO® pad
12*d* wall of handle 12
12*dd* flexible fastener VELCRO® pad
12*ddd* flexible fastener VELCRO® pad
12*e* closed recess inside of flap 12*b* of handle 12
12*f* optional open sides of handle 12
12*g* wall of handle 12
12' alternate embodiment handle
12*o* manually graspable hole of handle 12
13 main base body of tool caddy
14, 15, 16, 17, 18 tool pockets
19 reverse rear side of tool caddy
20 auxiliary rear pocket
21 tool support hooks
22 tool ring bracelets
23, 24 fasteners
25 fastener straps
26 pens
27 drill bits
28 awls
29 clippers
30 hammer
30*a* accessory tray
31 screw driver
31*a* hook for tray 30*a*
32 pick tool
32*a* accessory tray plate
33*a* plate slot for accessory tray
40 interior spines
110 rolling tool bag 110
111 telescopic and non-telescopic support members
112 rolling tool bag handle
210 rolling tool bag
210*a* extensible handle of rolling tool bag 210

211 telescopic supports of rolling tool bag 210
212 rigid unhinged tool work surface
212*a* bottom recess of rigid unhinged tool work surface
212*b* clamping mechanism
214 tool holding indentation
216 tool holding indentation
218 tool holding indentation
224 knob
225 adjustment screw
227 moving plate jaw
307 tool
310 rolling tool bag
310*a* extensible handle of rolling tool bag 310
311 telescopic supports of rolling tool bag 310
312*b* clamping mechanism
312 hinged hollow tool caddy
312*a* bottom recess of hinged tool work surface case
323 cover
324 knob
325 adjustment screw
327 moving plate jaw

DETAILED DESCRIPTION OF THE INVENTION

Figure 8:
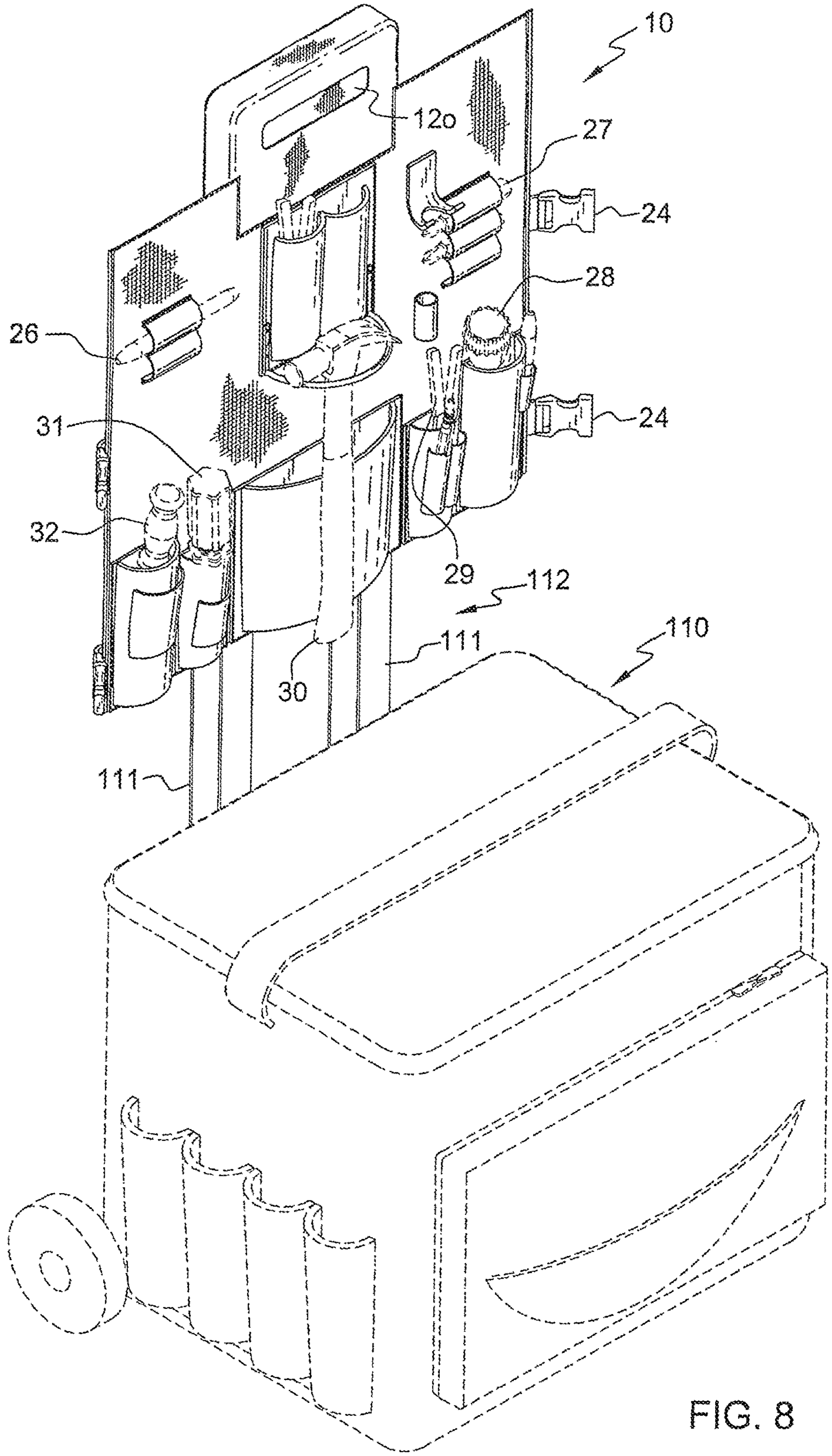
FIG. 8 is a perspective view of the portable tool caddy of the present invention, shown mounted on an extensible handle of a rolling tool bag, wherein the rolling tool bag is shown in dashed lines for environmental purposes.

As shown in FIG. 8, the present invention relates to a portable tool caddy that provides a tool caddy 10 that mounts on top of, and, in combination with, a rolling tool bag handle 112 of telescopic and non-telescopic support members 111 of wheeled rolling tool bag 110, or similar luggage and hand trucks. This invention provides a portable, mountable, preferably tool caddy 10 for anyone, such as a tradesperson, who requires a portable tool caddy. For example, it is suitable for tradesworkers who require a portable tool caddy 10 to provide a surface to hold and visually display specific tools from a rolling tool bag 110. The apparatus can be used similarly by any mobile field personnel who require a portable tool caddy 110.

The portable tool caddy 10 includes a flexible main flat surface substrate base body 13 having a front surface and a rear surface with tool pockets 14, 15, 16, 17, 18 etc., mounted on the front surface. A manually graspable handle 12 is mounted preferably on the rear surface, and the handle 12 extends above a top edge of the main flat surface base body 13. The manually graspable handle 12 also has a closed ended recess 12*a* in a bottom of the handle 12, which is adapted to fit over a top horizontally spanning handle 112 of one or more telescopic members 111 of a rolling bag 110 or hand truck for support, where each telescoping member 111 extends upward from the rolling bag 110 or hand truck, so that the tool caddy 10 may be positioned at a level convenient for a user.

Preferably the tool caddy handle 12 has a grasping opening 12*o* for carrying the tool caddy, when it is not supported upon the spanning handle 112 atop the telescopic members 111 of the rolling tool bag 110 or hand truck.

Fasteners 23, 24 are mounted on the rear surface and extend out from side edges of the main flat surface base body 13 of the tool caddy 10, to allow the main body 13 to be collapsed with the fasteners 23, 24 connecting respective side edges to each other, to form a readily portable apparatus.

The tool caddy 10's main flat surface body 13 is preferably made of canvas or other flexible plastic, metal and/or fabric material, to be sufficiently flexible to allow the main body 13 to be rolled up. In use as a tool holder display, the tool caddy 10 has one or more arcuately bent interior spines 40, which are embedded in the main flat surface base body 13, extending toward side edges of the main base body 13 from lower corner edges of the handle 12, and optionally a second pair of arcuately bent interior spines 40 are embedded in a bottom edge of the main base body 13 directly opposite the first pair of embedded spines 40, to provide a spread-out, partially arcuate shape for displaying the carried tools, when deployed.

Figure 4:
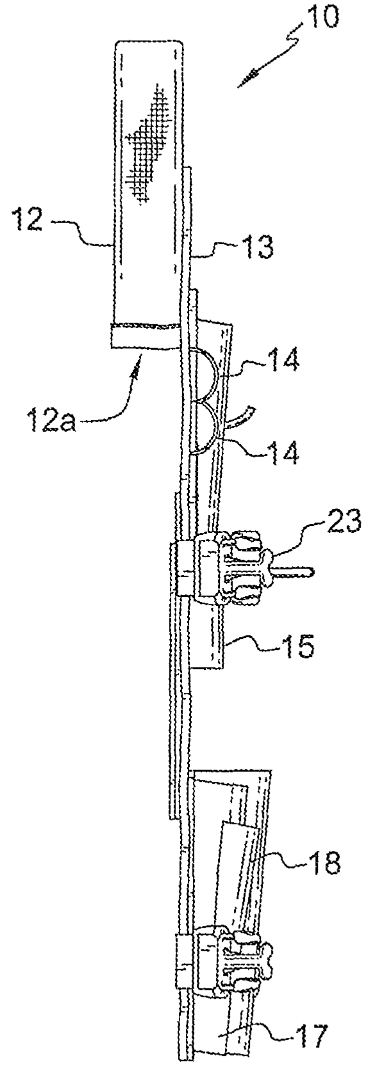
FIG. 4 is a left side elevation view of the portable tool caddy.
Figure 5:
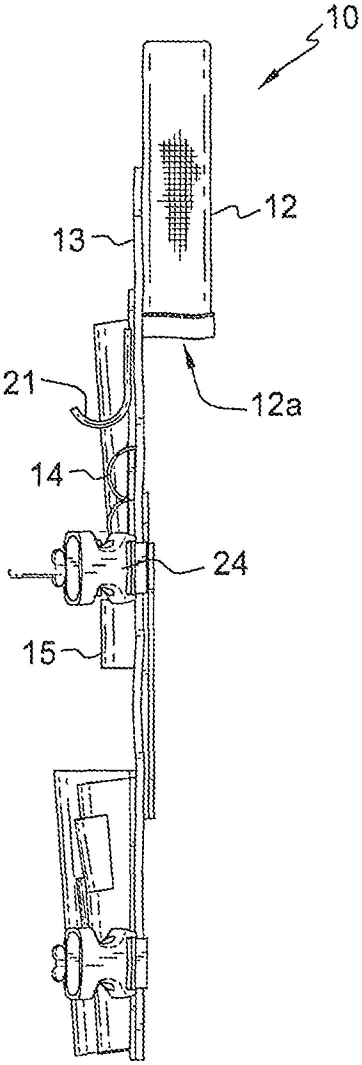
FIG. 5 is a right side elevation view of the portable tool caddy.
Figure 7:
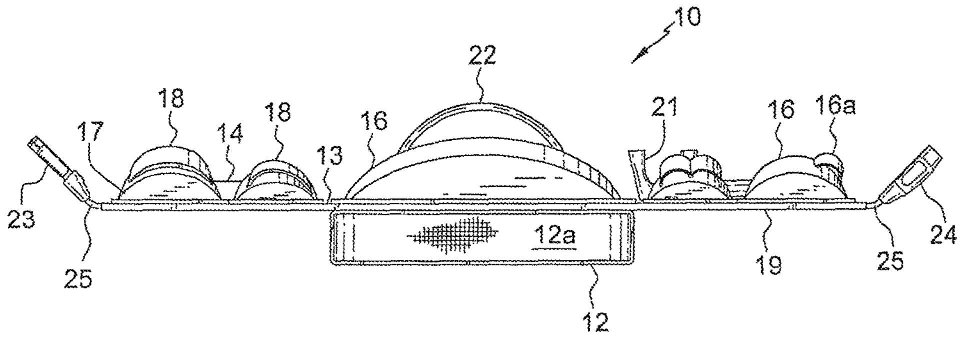
FIG. 7 is a bottom view of the portable tool caddy, showing the open receptacle recess within the carry handle of the portable tool caddy.

As shown in FIGS. 4, 5 and 7, this portable tool caddy 10 is secured to the rolling tool bag 110's handle 112 by means of an upwardly extending, bottom closed ended cavity receptacle 12*a* of manually graspable top tool caddy handle 12 on top of the portable tool caddy 10. The tool caddy handle 12 includes a through-hole grasping opening 100 for a user to insert a hand therethrough for manually grasping tool caddy handle 12 of tool caddy 10. The universal design of a loose, friction or compressive fit within hollow receptacle 12*a* of top handle 12 can accommodate tool bag handles of varying widths and thicknesses. Due to the universal design, the application of this portable tool caddy 10 is not limited to particular rolling tool bag equipment handles 112.

The portable tool caddy 10 mounts to the top of the telescopically extensible rolling tool bag handle 112 of the vertical, extensible, telescopic or non-telescopic support members 111 of wheeled rolling tool bag 110, or similar wheeled, rolling luggage or hand trucks, when the handle 12 of the tool caddy 10 holds the handle 112 of extensible supports 111 of rolling, wheeled tool carry bag 110. The rolling tool bag handle 112 is secured within receptacle 12*a* by means of an integral insertable loose, friction or compressive fit. Handle 12 has a grasping opening 12*o* for the user to hold the tool caddy 10, but also to enable the user to insert his or her hand through the grasping opening 12*o*, for wheeling, the tool bag 110 with tool caddy 10 supported thereon. The user can also lift the tool caddy 10 off of the handle 112 of the wheeled tool bag 110 and separately carry the tool caddy 10 by hand.

FIG. 1 shows an embodiment for a portable tool caddy 10 having a flat front surface base 13 and a carry handle 12 on top, with a plurality of tool accommodating pockets 14, 15, 16, 17 and 18, etc. Carry handle 12 has a hollow bottom recess 12*a* to accommodate the insertion of a top handle member 112 supported by extensible supports 111 of a tool carry bag 110, shown in FIG. 8 herein.

Optional auxiliary tool support hooks 21 or ring bracelets 22 may also be provided on front surface 13 of tool caddy 10, or on the reverse rear side 19 thereof. The depiction of pockets 14, 15, 16, 17 and 18 on front surface 13 is not limited to the configuration shown, as the tool pockets 14, 15, 16, 17 and 18 may vary in shape and size, and may be provided on front surface 13 of tool caddy 10, or on rear surface 19 of tool caddy 10.

Figure 2:
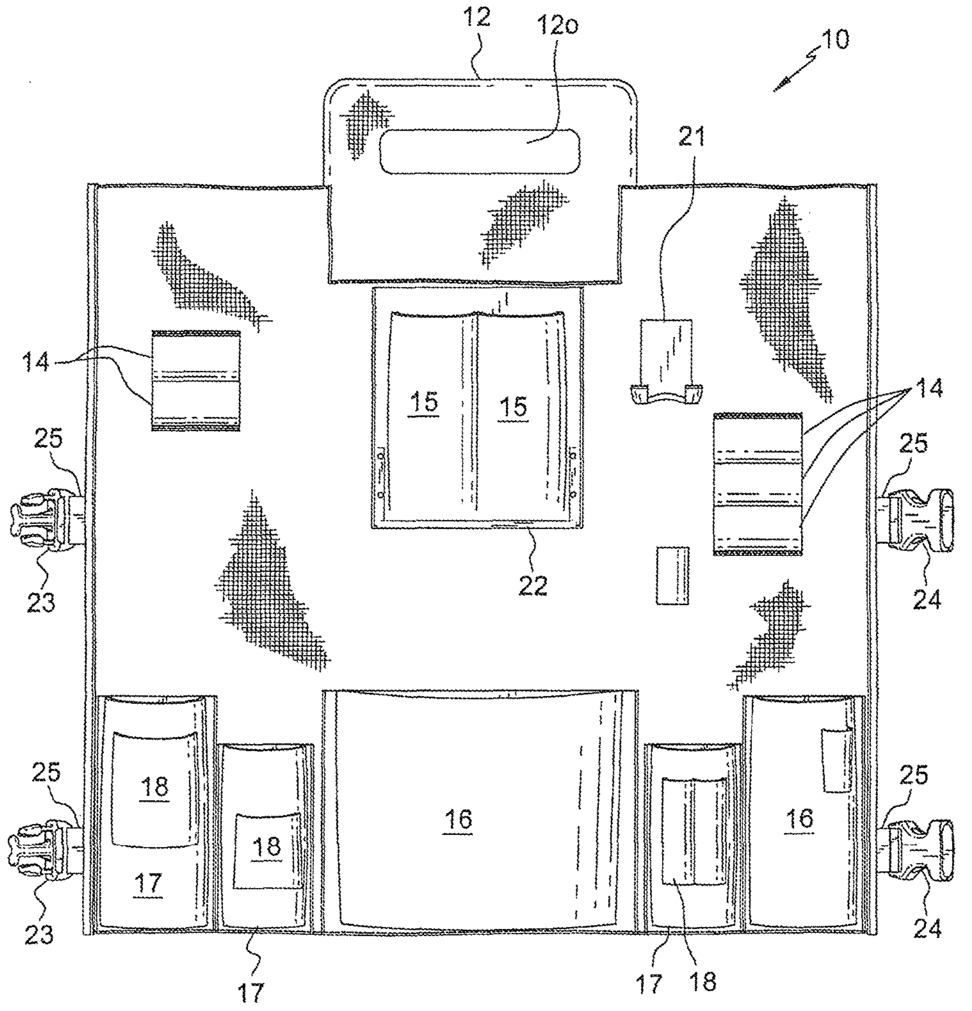
FIG. 2 is a front elevation view of the portable of the present invention, showing the tool caddy prior to mounting atop a typical wheeled luggage or rolling tool bag luggage handle.

FIG. 2 shows a front view of the surface 13 of portable tool caddy 10, showing the tool caddy 10 with handle 12 and handle grasping opening 12*o*, prior to mounting atop a typical wheeled luggage or rolling tool bag 110 upon its extensible supports 111, having tool bag handle 112 thereon.

Figure 3:
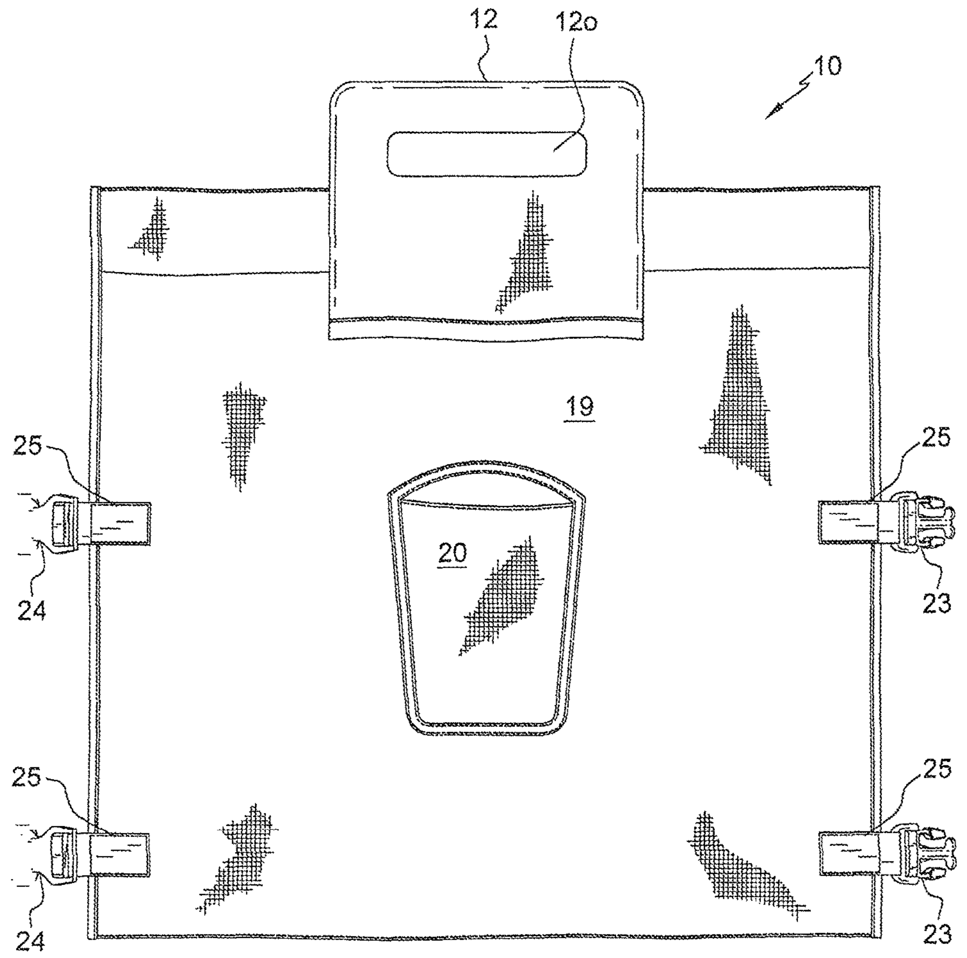
FIG. 3 is a rear elevation view of the portable tool caddy.

FIG. 3 shows the rear 19 of the portable tool caddy 10, with handle 12 and handle grasping opening 12*o*, with auxiliary pocket 20.

FIGS. 4 and 5 show the left and right side views of tool caddy 10.

Figure 6:
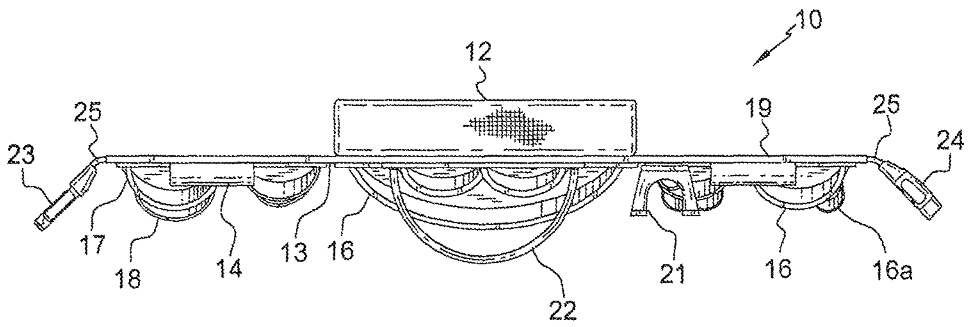
FIG. 6 is a top plan view of portable tool caddy.

FIGS. 6 and 7 show top and bottom views of the portable tool caddy 10, wherein the closed ended recess view of cavity 12*a* of handle 12 is depicted in FIG. 7.

FIG. 8 shows the portable tool caddy 10 mounted on an extensible handle 112 of a rolling tool bag 110, wherein the rolling tool bag 110 is shown in dashed lines for environmental purposes. FIG. 8 also shows tools, such as pens 26, drill bits 27, awls 28, clippers 29, hammer 30, screw driver 31 or pick 32. FIG. 8 also shows manually graspable hole 120 in handle 12, for insert of a hand therein.

Figure 7A:
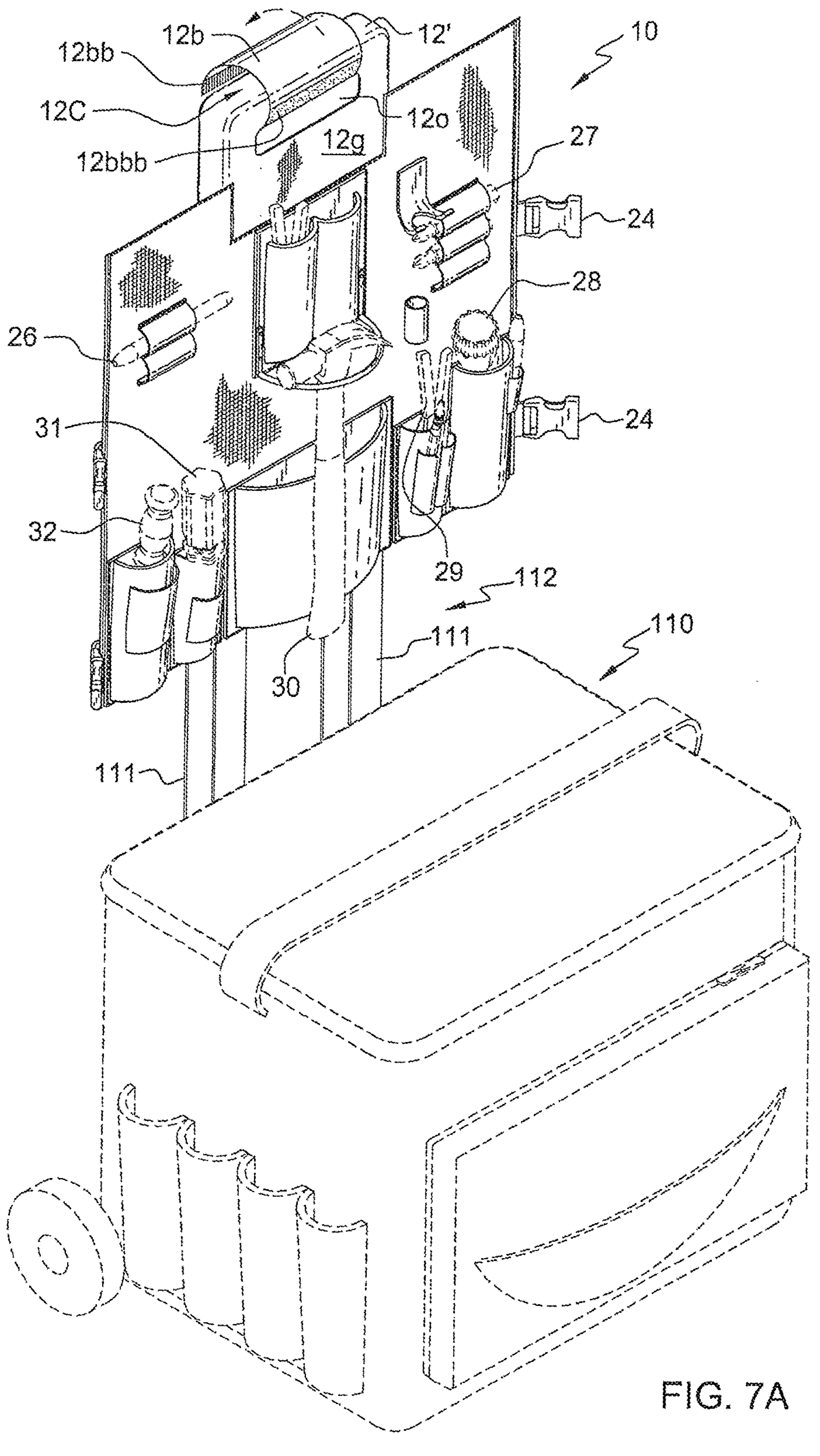
FIG. 7A is a perspective view of an alternate embodiment for the handle with an auxiliary closure tightening flap over the handle with the closed recess receptacle.
Figure 7B:
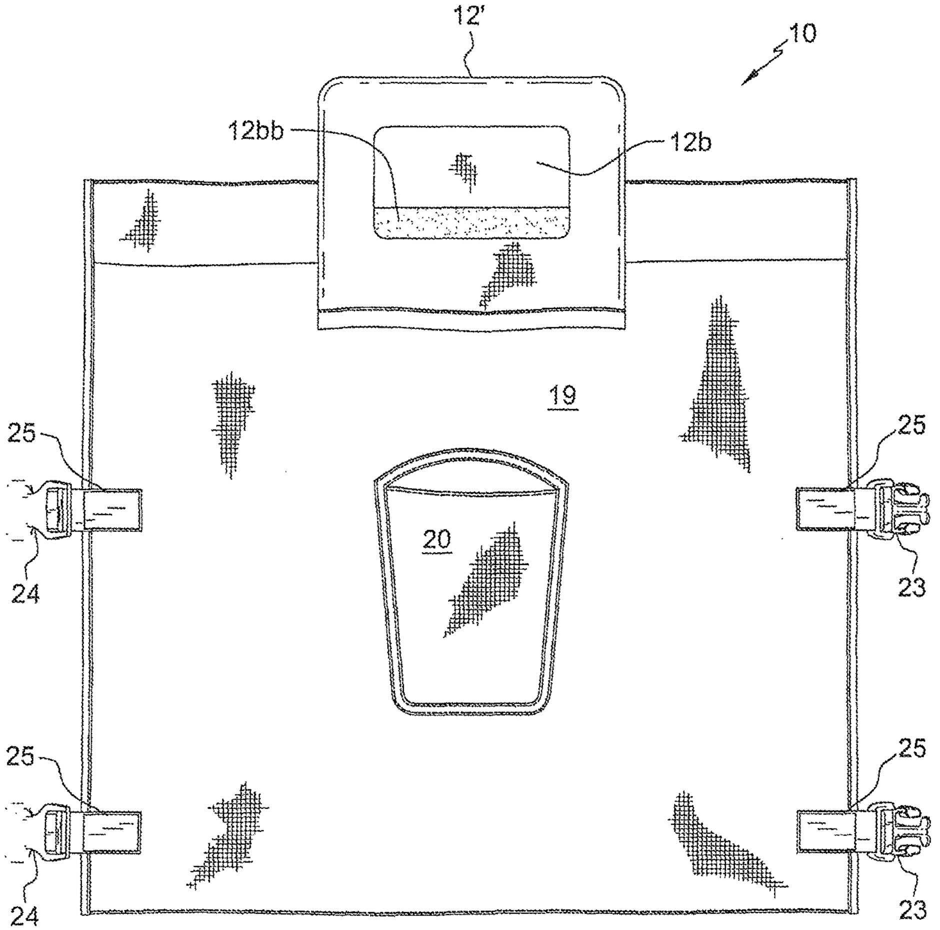
FIG. 7B is a rear view of the alternate embodiment of FIG. 7A for the handle with a flap wrapped over the handle with the closed recess receptacle.

While FIGS. 4, 5 and 7 show hollow receptacle 12*a* being a closed recess formed within upright walls of handle 12, as shown in an alternate embodiment of FIGS. 7A and 7B, in handle 12', one of the walls 12*g* spanning between the two telescopic members 111 of the wheeled rolling bag 110 can have a flexible flap 12*b* which can be wrapped and tightened around the handle 12' and fastened with fasteners, such as snaps, or by flexible fastener 12*bb*, such as hook and loop VELCRO® type fastener pads, which wraps around the top of handle 12, joining a reciprocal fastener 12*bbb*. Therefore the wrapped flap 12*b* encloses over the horizontal tool bag handle 112 located on the top of telescopic support members 111 of the rolling tool bag 110. The flexible flap 12*b* extends through the grasping opening 12*o* of handle 12 of tool caddy 10, for wrapping around the top the top of the tool caddy handle 12 handle and the top horizontally spanning handle 112 of the telescopic members 111 of wheeled rolling tool bag 110, for securing the tool caddy 10 to the spanning handle 112 of the wheeled rolling tool bag 110. The flexible flap 12*b* preferably has a flexible fastener 12*bb* for attaching overlapping edges thereof, to secure the tool caddy 10 to the horizontally spanning handle 112 of the telescopic members 111 of the wheeled tool bag 110. One edge of the flexible flap 12*b* is attached to the handle 12 of the tool caddy 10, adjacent to the grasping opening 12*o*, so that it is always available for use when needed.

Figure 7C:
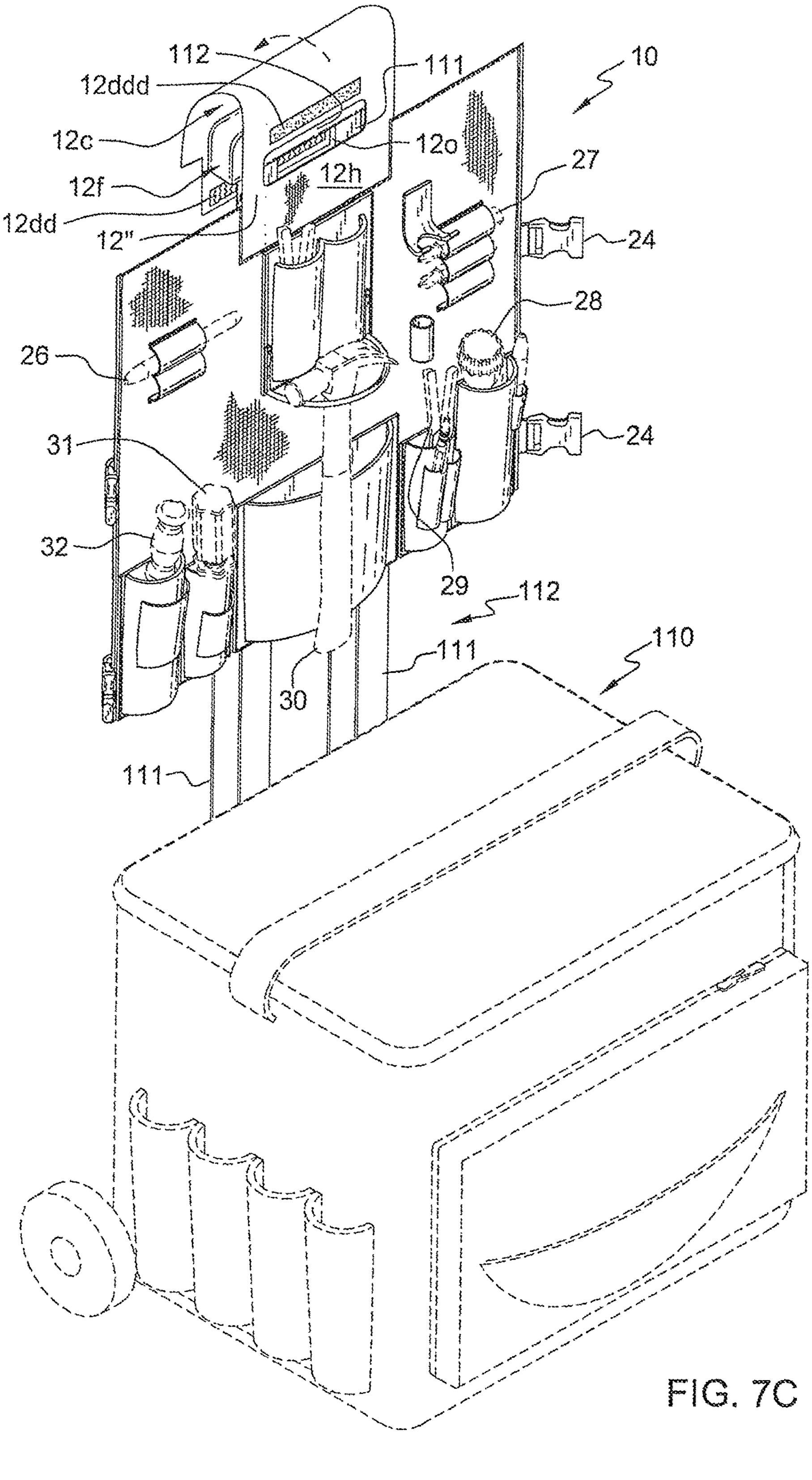
FIG. 7C is a perspective view of a further alternate embodiment for the handle with a flap providing an open sided closed recess receptacle.

As shown in a further alternate embodiment of FIG. 7C, the handle 12" is closed on the top and spanning sides between the telescopic members 111, but can has open sides 12*f*, wherein one of the walls 12*d* spanning between the two telescopic members 111 of the wheeled rolling bag 110 can be a flexible flap 12*d*, which can be wrapped around the handle 12 and fastened with fasteners, such as snaps or flexible fasteners, such as hook and loop VELCRO® type fastener pads 12*dd* and 12*ddd*. The wrapped flap 12*d* encloses over the horizontal tool bag handle 112 located on the top of telescopic support members 111 of the rolling tool bag 110, creating a closed recess 12*e* inside of flap 12*b* for supporting tool caddy 10 on top of horizontal tool bag handle 112. The flexible flap 12*b* of FIG. 7C also extends through the grasping opening 12*o* of handle 12 of tool caddy 10, for wrapping around the top the top of the tool caddy handle 12 handle and the top horizontally spanning handle 112 of the telescopic members 111 of wheeled rolling tool bag 110, for securing the tool caddy 10 to the spanning handle 112 of the wheeled rolling tool bag 110. The flexible flap 12*b* preferably has a flexible fastener 12*bb* for attaching overlapping edges thereof, to secure the tool caddy 10 to the horizontally spanning handle 112 of the telescopic members 111 of the wheeled tool bag 110. One edge of the flexible flap 12*b* is attached to the handle 12 of the tool caddy 10, adjacent to the grasping opening 12*o*, so that it is always available for use when needed.

Figure 7D:
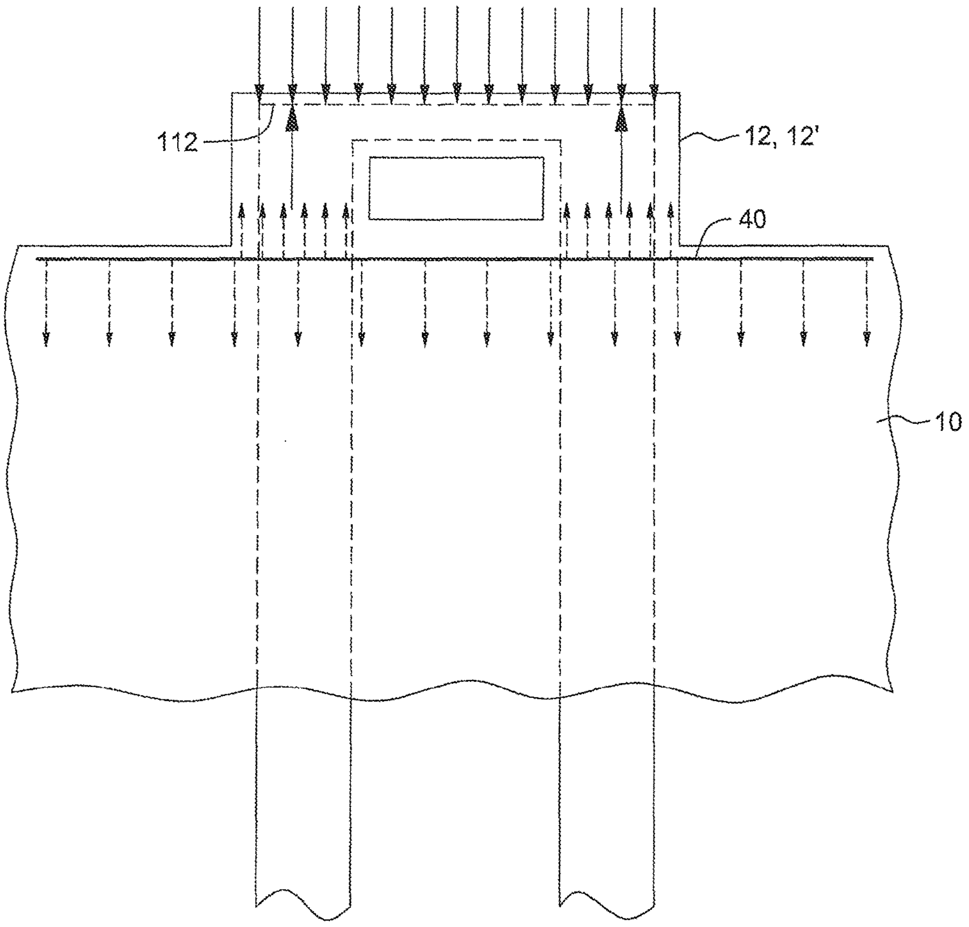
FIG. 7D is a vector force diagram of distributed upward and downward of loads of the handle on the portable tool caddy of FIGS. 7A, 7B and 7C.

FIG. 7D represents the structural support vector diagram for the alternate tool caddy handle support that mounts on top of a wheeled or rolling tool bag by wrapping the caddy fabric underneath and around the tool bag handle and mechanically fastening it with VELCRO® or similar fastening means.

The present invention shown in FIG. 7D is different and distinct from Shipman (Patent Application Publication. No.: US 2003/0227148 A1), because the Shipman, tool holder provides a handle separate from their two vertical means of support. As distinguished, the current invention, being different from Shipman, provides an integral handle and tool caddy support combined within the handle. The tool caddy 10 is vertically supported through the two upward vectors that is supported by the substantially distributed load downward on the tool bag handle 112 and down through the vertically extensible members 111 of the rolling tool bag 110. Unlike the tool carrier of Shipman '148 with two separate structural loads produced by Shipman's separated hanging straps 70 and 72, in the portable tool caddy of the present invention the downward distributed load indicated by the downward arrows at the top of handle 12 or 12' laying over inserted handle 112 of rolling wheeled tool bag 10, with telescopic handles 111, is actually supported by two upward vectors; one each extending at the top of each telescopic handle 111. These upward vectors support the tool caddy 10 and spine 40 keeps the tool caddy spread open for viewing and accessing tools, by evenly distributing the load downward evenly from spine 40, so that the upward and downward forces are in equilibrium. In contrast, Shipman's hanging straps (Item 70 and 72) vector force configuration differs from the present invention in FIG. 7D, because it is supported by two vertical upward vector forces transmitting the load substantially to two point loads on a sample horizontal support (Item 80 of Shipman). Shipman's alternate embodiment (Support Plate 44 and extensions 56, 58) utilizes a rigid support plate fastened to the full width of the tool bag that provides a continuous distributed load to the support plate from continuous distributed load of the tool holder. This structural loading differs substantially with the structural loading of the present invention, as represented in FIG. 7D, where the telescopic handles 111 of rolling tool bag 110 counteract the downward load forces against handle 12, 12' and the horizontal, internal spine 40 of the portable tool caddy's evenly distributed downward load, to keep spine 40 and tool caddy 10 open, to enable the user to view and access all tools in portable tool caddy 10. In different embodiments, the horizontal spines can vary from substantially unbendable/rigid to fully flexible in the horizontal plane. In the vertical plane, the horizontal spines 40 will remain substantially rigid to support the tool caddy vertical load.

Figure 9:
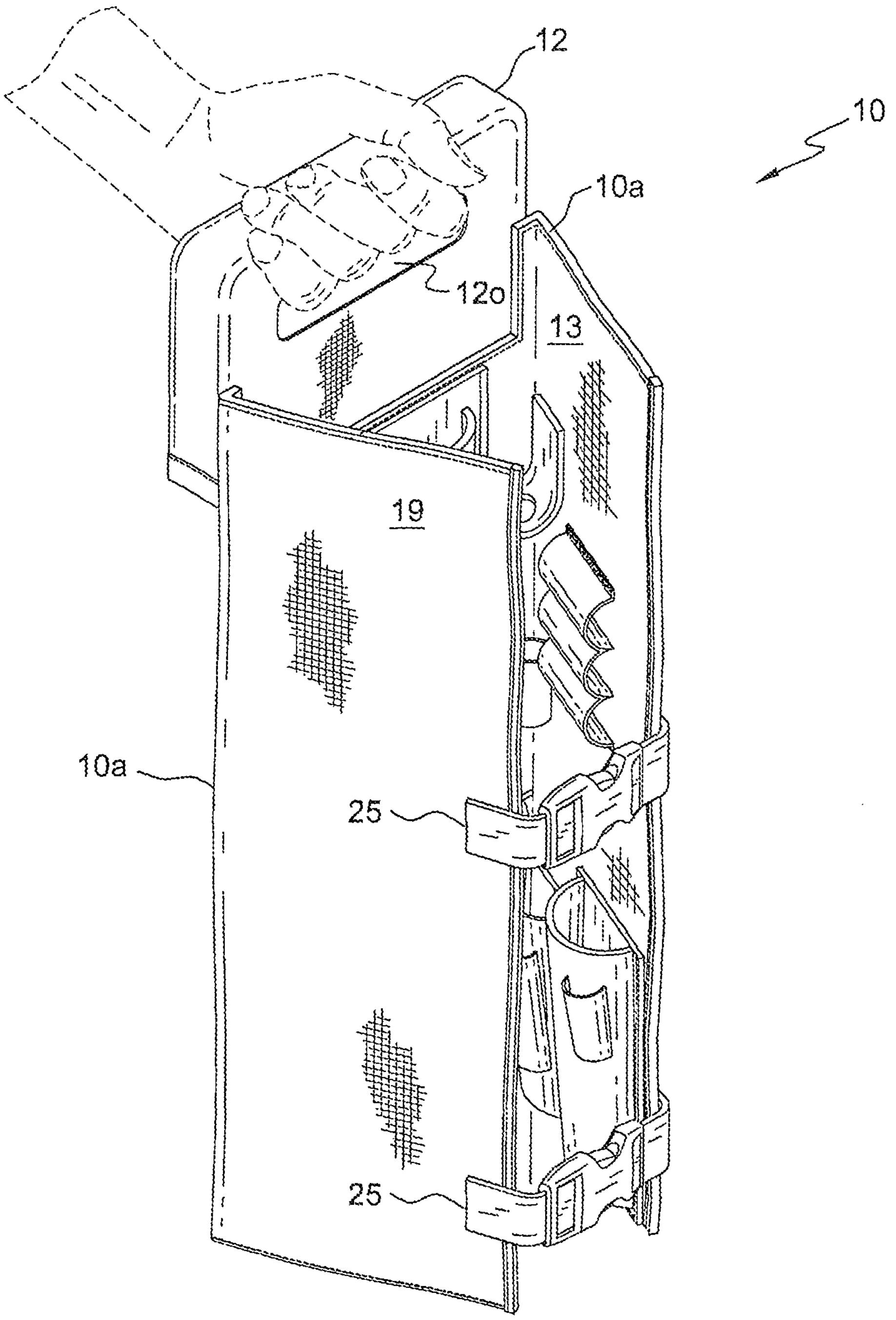
FIG. 9 is a perspective view of the portable tool caddy of the present invention being folded inward and closed by snap fasteners, with attached fabric connectors connecting the portable tool caddy to the fasteners.

FIG. 9 shows the portable tool caddy 10 folded inward along lines closed by snap fasteners 23, 24 with attached fabric converters 25 connecting the portable tool caddy 10 to the fasteners 23, 24. To carry the tool caddy 10 by hand with tool caddy handle 12, the tool caddy is folded together as shown in FIG. 9, where it can be folded into discrete panels, along vertical fold lines 10*a* each having an interior vertically extending rigid spine, and closed by fasteners, such as clasps with prong portions 23 mating with recess clasps 24 on an opposite side edge of portable tool caddy 10. Moreover, when folded along vertically extending lines 10*a*, which add rigidity by virtue of the interior vertically extending rigid spines, when placed down on a flat, horizontal work surface, the portable tool caddy 10 assumes a non-flat, three dimensional angular shape, and therefore can support itself in the upright position depicted in FIG. 9.

Figure 10A:
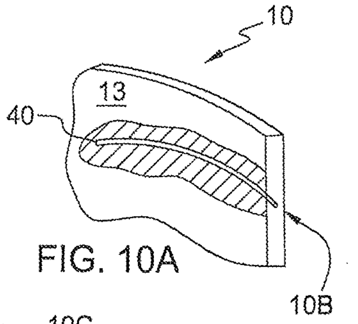
FIG. 10A is a close up detail view of an interior spine shown inside the portable tool caddy of the present invention, and as identified in the dashed view circle "10A" of FIG. 10.
Figure 10:
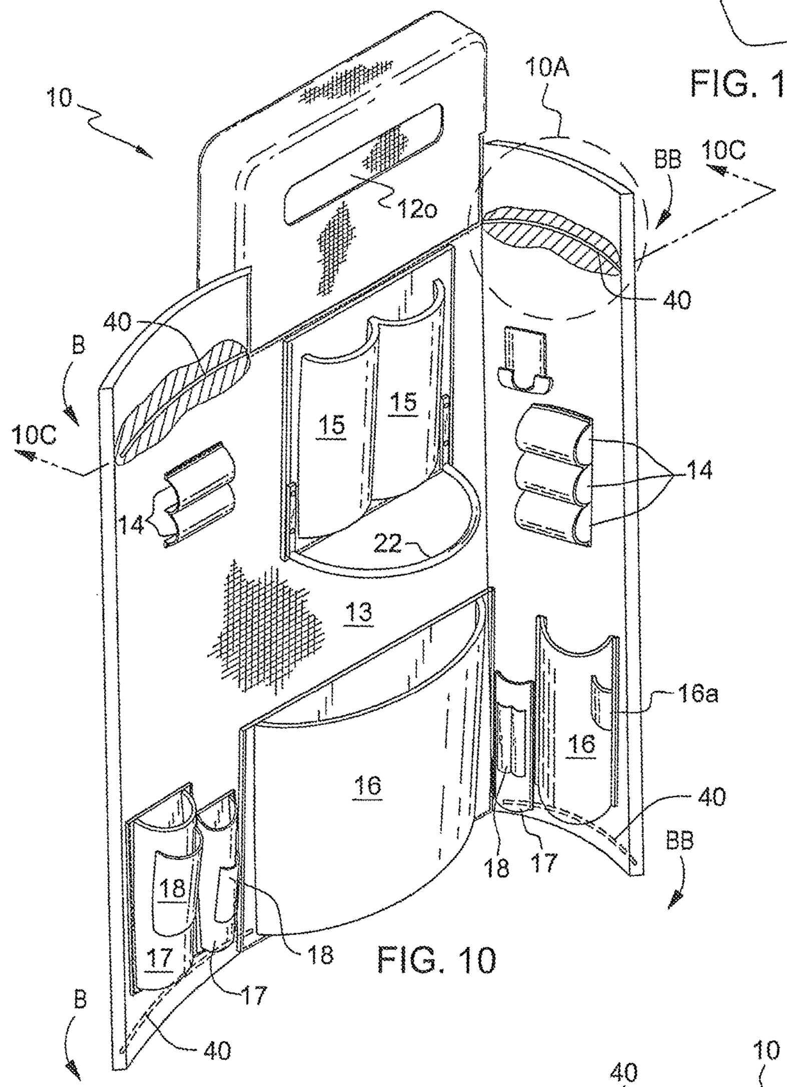
FIG. 10 is a perspective view of the portable tool caddy of the present invention shown in an open display position of use, wherein the lateral sides are bent arcuately in communication with the arcuately bent interior spines, shown in the cutaway portion identified within the dashed view circle "10A", wherein the bending is shown in curved arrows "B" and "BB"

FIG. 10 is a perspective view of the portable tool caddy 10 shown in a position of use, wherein the lateral sides are bent arcuately in communication with the arcuately bent interior spines 40 identified within the dashed view circle "10A", wherein the bending is shown in curved arrows "B" and "BB"; with at least one spine on the bottom edge, so that portable, tool caddy 10 can assume a mostly planar flat or partially arcuate shape, and therefore retains its mostly flat upright position depicted in FIGS. 10, 10A, 10B and 10C, when supported upon telescopic handle 12. In different embodiments, the horizontal spines can vary from substantially unbendable/rigid to fully flexible in the horizontal plane. In the vertical plane, the horizontal spines 40 will remain substantially rigid to support the tool caddy vertical load.

FIG. 10A is a close up detail view of an interior spine 40 shown inside a portable tool caddy and as identified in the dashed view circle "10A" of FIG. 10.

Figure 10B:
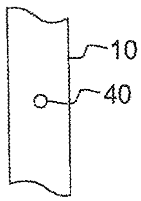
FIG. 10B is a close up end detail view of the end of an interior spine inside the flat base vertically extending wall of the portable tool caddy, and as identified by the view arrow "10B" of FIG. 10A.

FIG. 10B shows a close up end detail view of the end of a spine 40, shown inside the wall of the portable tool caddy 10, and as identified by the view arrow "10B" of FIG. 10A.

Figure 10C:
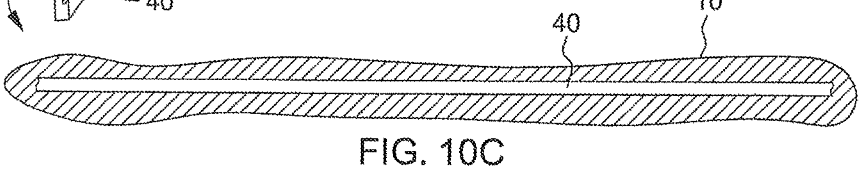
FIG. 10C is a crossectional view of a portion of the portable tool caddy, showing an interior spine, taken along, view arrows "10C-10C" of FIG. 10.

FIG. 10C shows an interior spine 40, taken along view arrows "10C-10C" of FIG. 10.

FIGS. 10, 10A, 10B and 10C therefore show tool caddy 10 as a portable work station in a working position, including carry handle 12 with handle opening 12*o*, implement holding sleeves 14, 15, 16, 17 and 18 for implements such as marking instruments, pencils and pens, hand tools, as well as hooks 21 or support rings 22.

Therefore, besides being mounted atop a rolling tool bag handle 112 with extensible supports 111, as shown in FIG. 8, the tool caddy 10 can also be retained in a mostly planar, flat or partially arcuate display position, as shown in an angular, non-flat configuration with vertical fold lines, shown in FIG. 9, or as shown arcuately as shown in FIGS. 10, 10A, 10B and 10C, when bent arcuately forward along horizontally extending flexible, bendable spines 40, in the direction B (on one side) and BB (on the other sides), shown in the directions along directional arrows "B" and "BB", so that the tool caddy 10 extends vertically upward along a vertical axis along its bent arcuate shape. At least two peripheral vertically extending fold lines or rigid spines 10*a* is located at or near the side edges of portable canvas tool caddy 10, to provide rigidity to the side edges of the portable tool caddy 10.

The tool caddy 10's material can include bendable metals, plastics, rubber, a rigid, nonbendable, nonclosable material, or canvas, and any combination thereof. Optional waterproof and water resistant design can provide enhanced benefits for protecting personal tools.

The carry handle 12, or other exterior surfaces of tool caddy 10, can be covered with PV cells (not shown) to charge personal electronics, such as a tablet or cell phone (not shown), via connecting cables, other charging surfaces, or by wireless charging.

Figure 11:
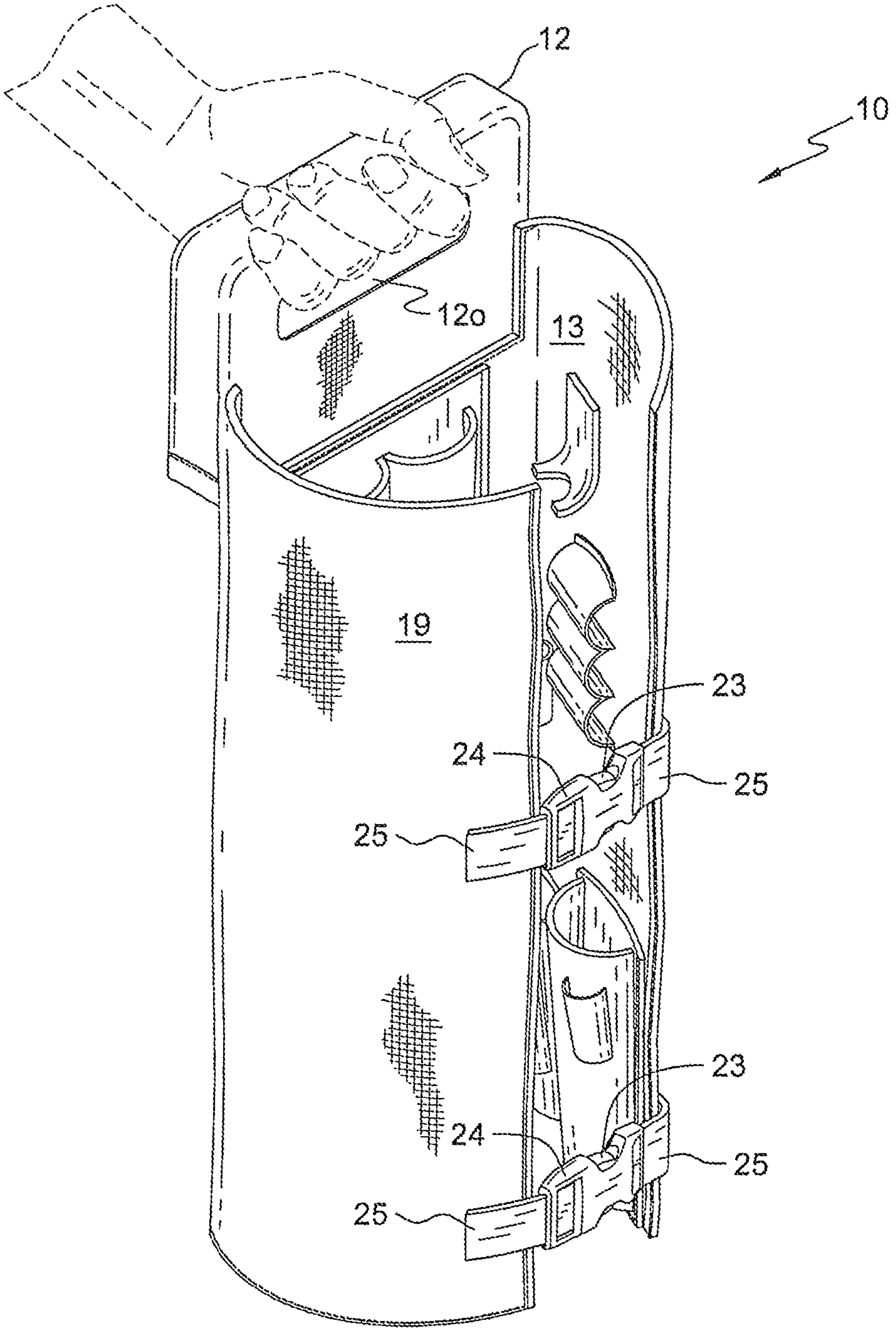
FIG. 11 shows a user holding the portable tool caddy in a closed position.

FIG. 11 shows a user having inserted a hand through handle opening 12*o*, and holding the handle 12 of the portable tool caddy 10 in a closed position.

Figure 12:
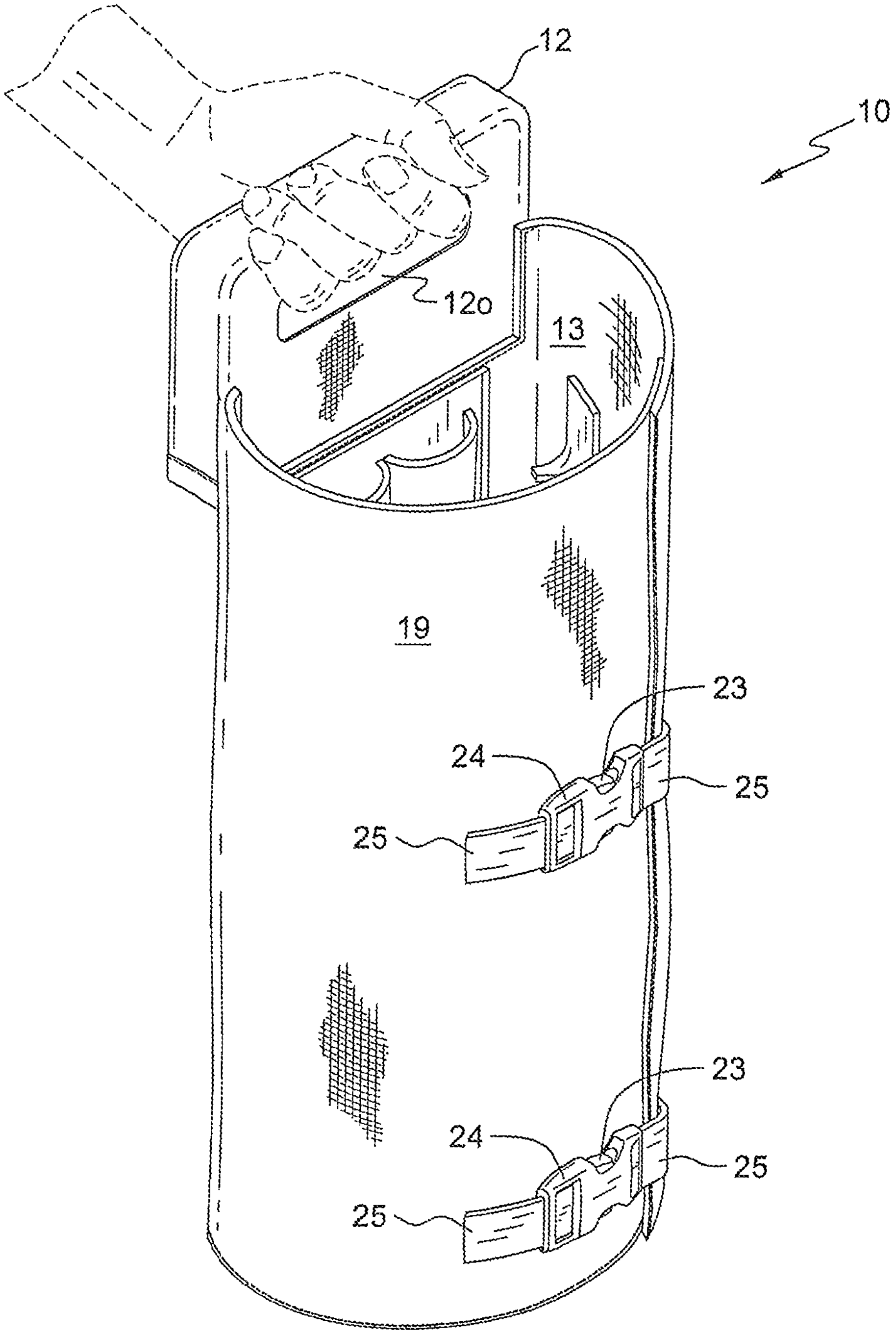
FIG. 12 shows a user holding the portable tool caddy in a closed position, where the fasteners are overlapping, so that the front is completely shut.

FIG. 12 also shows a user having inserted a hand through handle opening 12*o*, and holding the handle 12 of the portable tool caddy 10 in a closed position, where the fasteners 23, 24 are overlapping, so that the front of the tool caddy 10 is completely shut.

Figure 13A:
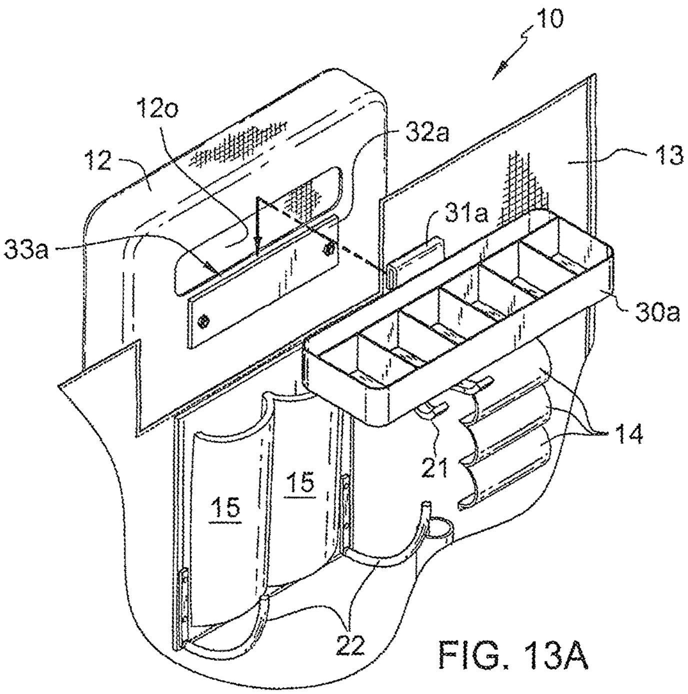
FIG. 13A shows an exploded close-up detail view of an attachable accessory tray.
Figure 13B:
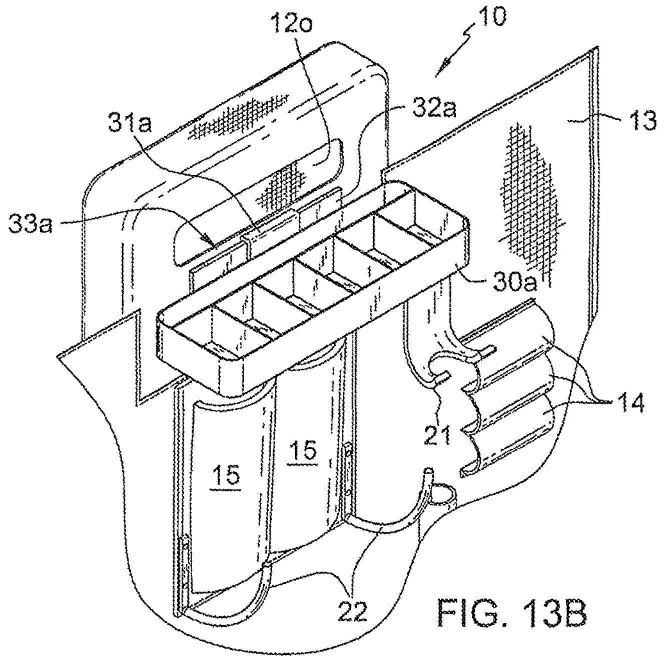
FIG. 13B shows an exploded close-up detail view of the attachable accessory tray of FIG. 13A, shown in place.

FIG. 13A shows an attachable accessory tray 30*a* having a hook 31*a* insertable with a slot 33*a* formed between a plate 32*a* and handle 12 of the tool caddy 10. FIG. 13B the attachable accessory tray 30*a* of FIG. 13A, shown in place.

Figure 14:
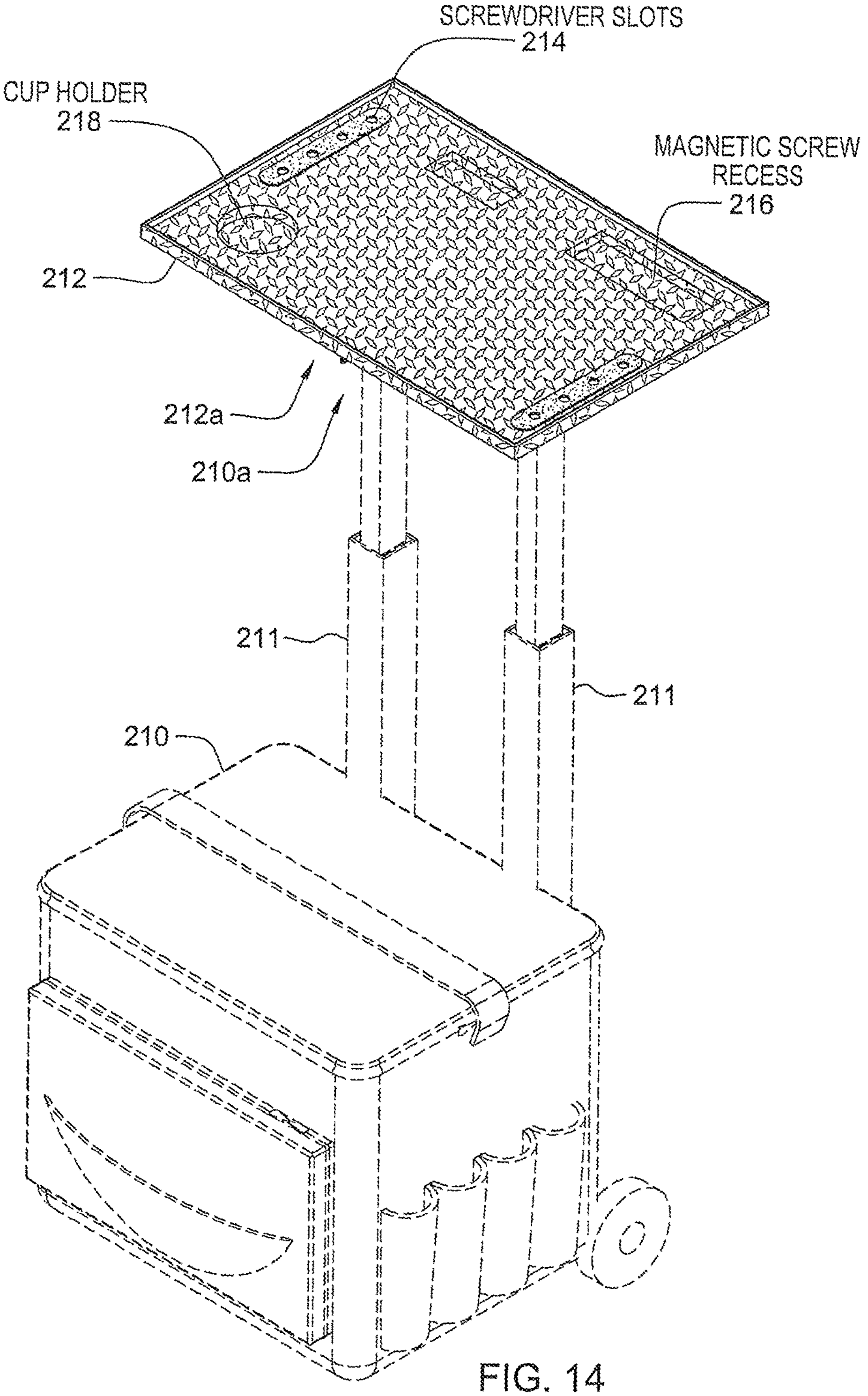
FIG. 14 is a perspective view for an alternate embodiment for a rigid unhinged tool work surface that remains solid and is mounted generally horizontally upon the telescopic handle of a rolling tool bag; and, FIG. 14A is a bottom perspective view of the rigid unhinged tool work surface of FIG. 14, showing a bottom recess for mounting the rigid unhinged tool work surface upon the telescopic handle of a rolling tool bag.
Figure 14A:
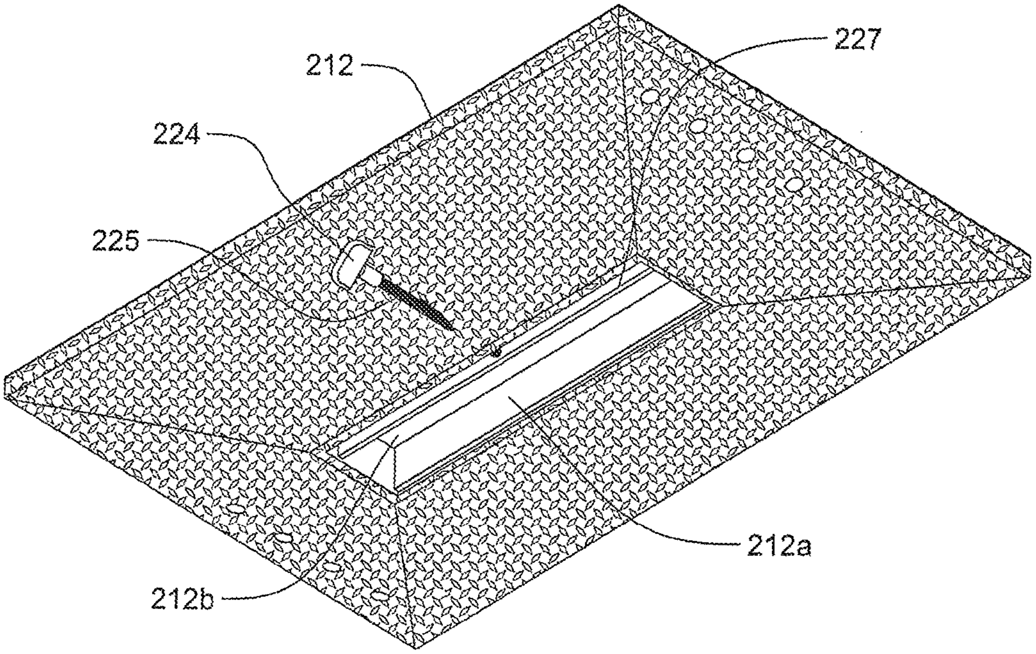

FIG. 14 shows an alternate embodiment for a rigid unhinged tool work surface 212 that remains solid and is mounted generally horizontally upon the telescopic handle 210*a* on top of telescopic supports 211 of a rolling tool bag 210. FIG. 14A shows a bottom of the rigid unhinged tool work surface 212, showing a bottom recess 212*a* for mounting the rigid unhinged tool work surface upon the telescopic handle 210*a* of a rolling tool bag 210. A clamping apparatus 212*b* with knob 224, adjustment screw 225 and movable plate 227 clamps the telescopic extensible handle 210*a* within the preferably closed ended bottom recess 212*a* for allowing the tool work surface 212 to be employed while mounted on the handle 210*a* and telescopic extensible supports 211. The rigid unhinged tool work surface 212 is a non-foldable box with no pivoting cover on top of the telescopic handle 210*a* of the rolling tool bag 210. It includes top indentations 214, 216 and 218 to hold tools, including, for example only, screw driver slots area 214, magnetic screw/tool recess 216 and cup holder 218. The rigid unhinged tool work surface 212 may be constructed of a permanently rigid sheet that remains flat and unfoldable, and that can be fabricated from sheet metal, rigid plastic or similar materials.

Figure 15:
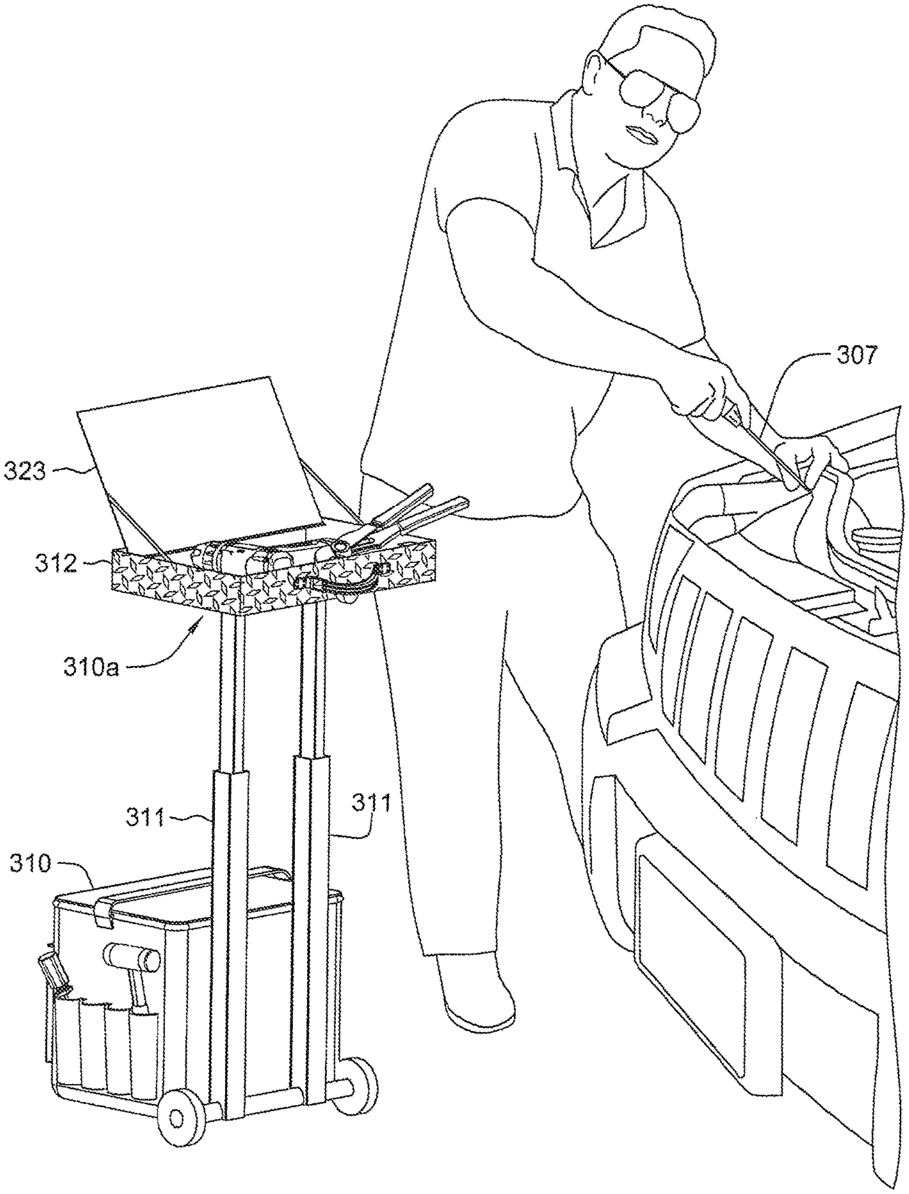
FIGS. 15, 15A and 15B show an alternate embodiment where a hinged tool work surface case 312 acts as a portable work station to support a laptop computer on top of the hinged tool work surface case 312.
Figure 15A:
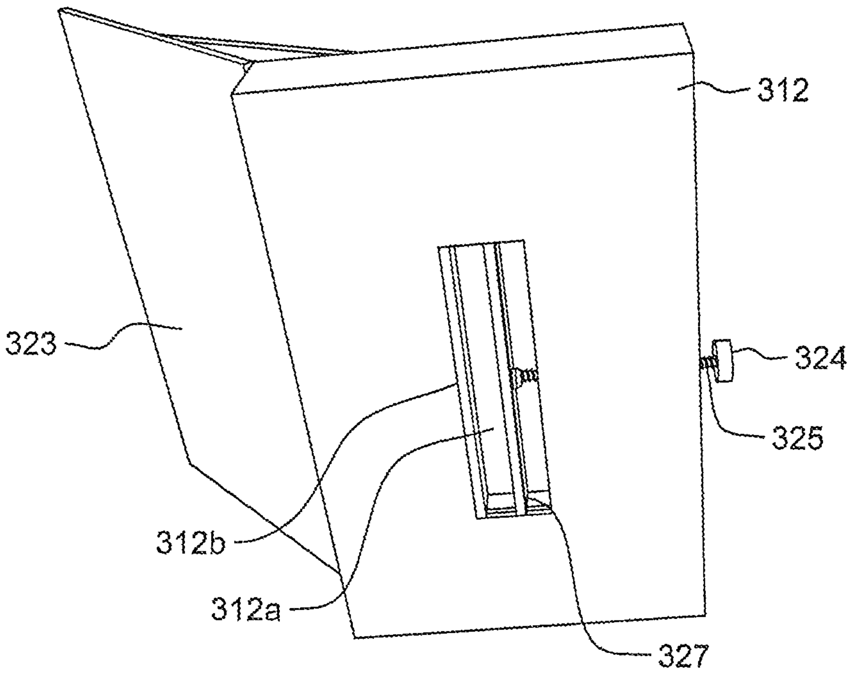
Figure 15B:
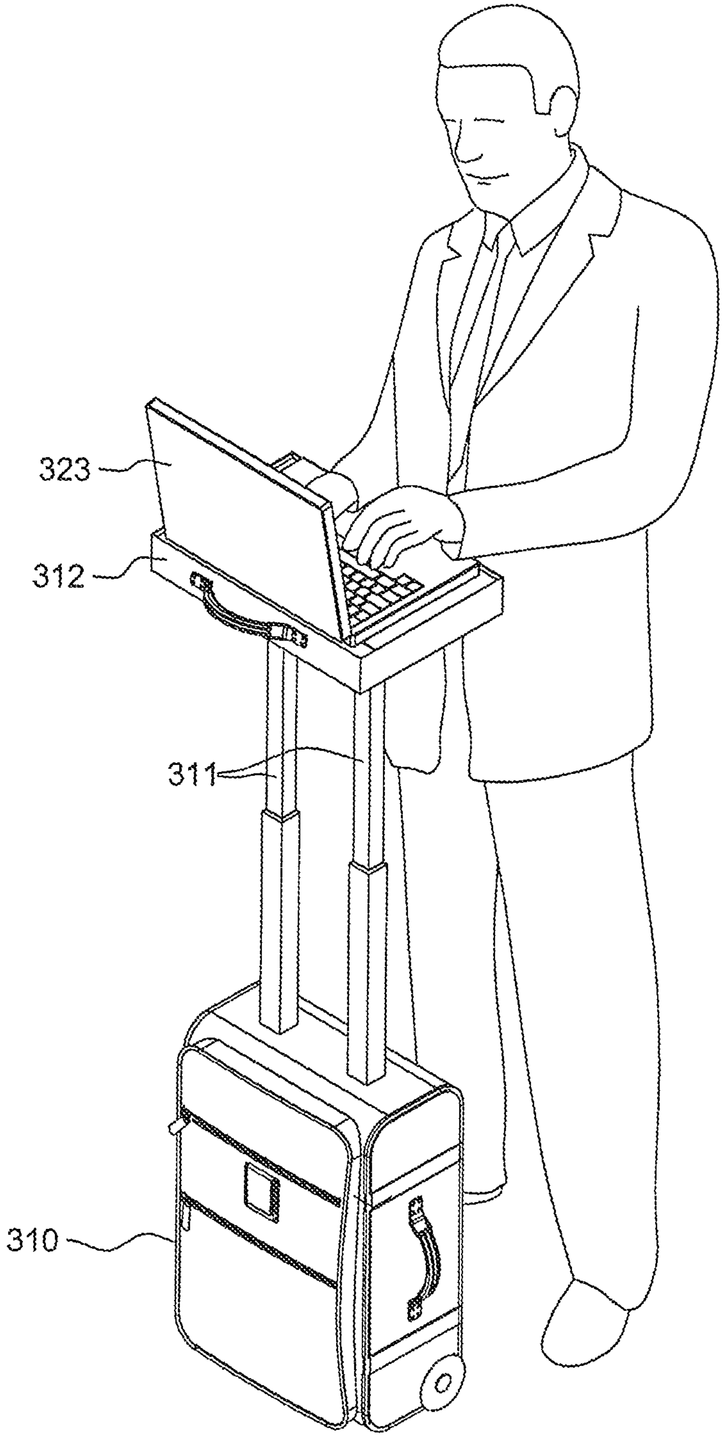

FIGS. 15, 15A and 15B show an alternate embodiment where a hinged tool work surface case 312 acts as a portable work station to support a laptop computer on top of the hinged tool work surface case 312, which includes an interior formed by a flat bottom, side walls and a cover adapted to be opened, wherein the cover, when closed, forms an outer work surface. A cavity recess 312*a* is provided within the interior of the hinged tool work surface case 312. The substantially flat bottom of the hinged tool work surface case 312 has the opening recess 312*a*, which is adapted to receive the handle member 310*a* of the upwardly extensible telescopic supports 311 of a rolling tool bag 310, when the hinged tool work surface case 312 is deployed on the handle 310*a* of the telescopic extensible supports 311 of the rolling tool bag 310. The hinged tool work surface case 312 is removable from the handle member 310*a* and the telescopic extensible supports 311 for storage or transport. A clamping apparatus clamps the handle member 310*a* within the preferably closed ended recess 312*a* for allowing the hinged tool caddy work surface case 312 to be employed while mounted on the handle 310*a* of the telescopic extensible supports 311 of the rolling tool bag 310.

FIG. 15 shows a technician using the hinged tool caddy work surface case 312 of the present invention as a portable workstation with tools and parts, including screwdriver 307, wherein the tool caddy work surface 312 preferably has a hard cover 323, such as, for example, a diamond plate cover.

FIG. 15A shows a bottom view of the tool caddy work surface case 312, prior to mounting on top of the extensible tool bag handle 310*a* of rolling tool bag 310, by placing the closed ended cavity 312*a* of the tool caddy 312 with clamping mechanism 312*b*, over the handle 310*a* supported by extensible telescopic supports 311, with the moving jaw plate 327 in its substantially open position. The knob 324, which is rigidly attached to the threaded adjustment screw 325, is rotated to advance the moving jaw plate 327 to apply a clamping force to both sides of the extensible handle 310*a* supported by extensible telescopic supports 311 of rolling tool bag 310 This clamping force secures the hinged tool work surface case 312 to the handle 310*a* of rolling tool bag 310.

FIG. 15B shows hinged tool work surface case 312 of the present invention in use with portable electronic device 350, such as a laptop computer, with a user standing.

While FIG. 15A shows the closed ended cavity 312*a* of tool caddy work surface case 312 substantially centered in the bottom of tool caddy work surface case 312, it is known that optionally the position of the closed ended cavity 312*a* can be positioned off-center, to have it be positioned either towards or away from the user, so that it is more conveniently used without the user having to lean forward or away from a comfortable standing position with respect to the position of the tool caddy work surface case 312, and to avoid any problems with tipping moments caused by the weight of the work surface case 312 upon the handle 310*a* on top of the extensible telescopic handles 311 of rolling tool bag 310. The above reasoning also applies to the bottom view of FIG. 14A for the non-foldable work surface 212, wherein the position of the bottom recess 212*a* can be moved off-center with respect to position of the non-foldable work surface 212 upon handle 210*a*, located on top of extensible telescopic handles 211 of rolling tool bag 210 of FIG. 14.

CONCLUSION, RAMIFICATIONS AND SCOPE

As the reader can see, the present invention is designed and constructed to provide a working prototype of a unique, portable canvas tool caddy 10 that attaches to a wheeled rolling tool cart 110 having extensible, telescopic supports 111 and a luggage handle 112 on top. In accordance with the spirit of this invention, this invention can similarly be used on non-telescopic applications or any application that benefits from this configuration. Preferably, the tool caddy 10 has one or more interior spine members, such as vertically extending spines extending in vertically extending rigid fold lines 10*a*, shown in FIG. 9, or such as horizontally extending bendable metal spines 40 as in FIGS. 10, 10A, 10B and 10C, so that the flat tool caddy 10 can be bent angularly along rigid vertical fold lines 10*a* or bent arcuately along bendable horizontal spines 40, to form an arcuate wall surface substrate tool caddy 10, which has a shape which is retained when bent, such as a mostly planar flat and/or partially arcuate shape in its open position, for display of the tools within the tool caddy, and ease of grasping one or more tools 26, 27, 28, 29, 30, 31 and/or 32 on a job site.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention. It is further known that other modifications may be made to the present invention, without departing the scope of the invention.

We claim:

1. A portable work station comprising in combination:

a mobile device having at least one upwardly extensible telescoping member with a horizontally extending handle member at a top end thereof for directing and controlling movement of said mobile device;

a work station body adapted to be used in combination with the mobile device, said work station body comprising a body with a flat bottom, side walls and a top surface forming an outer work surface;

said flat bottom having a receptacle opening adapted to receive said horizontally extending handle member when said work station body is deployed on said extensible telescoping member, said work station body being removable from said horizontally extending handle member and said extensible telescoping member for storage or transport; and an apparatus for clamping said horizontally extending handle member within said receptacle opening for allowing said work station body to be employed while mounted on said extensible telescoping member.

2. The portable work station as in claim 1 wherein said work station body is a rigid unhinged body.

3. The portable work station as in claim 2 wherein said portable work station body includes an unhinged tool work surface constructed of a permanently rigid sheet that remains flat and unfoldable.

4. The portable work station as in claim 2 wherein said rigid, unhinged work station body supports a laptop computer on top of said unhinged tool work surface body.

5. The portable work station as in claim 1 wherein said work station body is a hollow case with a hinged cover.

6. The portable work station as in claim 5 wherein said hollow hinged work station body supports a laptop computer on top of said hinged tool work surface case.

7. The portable work station as in claim 1 wherein said clamping apparatus further comprises a knob, an adjustment screw and a movable plate, said clamping apparatus clamps the extensible telescoping handle within said receptacle opening, which said receptacle opening further comprises a closed ended bottom recess of said portable work station for allowing the tool work surface to be employed while mounted on the handle and extensible telescopic member.

8. The portable workstation as in claim 1 wherein the portable work station body is a non-foldable box, with no pivoting cover, mountable on top of the extensible telescopic handle of the mobile device.

9. The portable work station as in claim 1 wherein the portable work station body includes top indentations to hold at least one of tools, screw driver slots area, a magnetic screw/tool recess and a cup holder.

10. The portable work station as in claim 1 wherein said portable work station body is fabricated from the group consisting of sheet metal, rigid plastic or rigid natural materials.

11. The portable work station as in claim 1, wherein the at least one upwardly extensible telescoping member is a plurality of upwardly extensible telescoping members.

12. The portable work station as in claim 11 wherein a position of said receptacle opening of said closed ended bottom recess of said work station body is a closed ended cavity being positioned off-center, to have said receptacle opening be positioned either towards or away from the user, so that said work station body is conveniently used without the user having to lean forward or away from a comfortable standing position with respect to the position of the work station body, and to avoid any problems with tipping moments caused by the weight of the work station body upon said horizontally extending handle member on top of the extensible telescopic handles of said mobile device.

* * * * *